(12) United States Patent
Han

(10) Patent No.: US 11,461,860 B2
(45) Date of Patent: Oct. 4, 2022

(54) SIGNING METHODS, APPARATUSES AND DEVICES OF ELECTRONIC CONTRACT

(71) Applicant: ALIPAY (HANGZHOU) INFORMATION TECHNOLOGY CO., LTD., Zhejiang (CN)

(72) Inventor: Zhe Han, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,939

(22) Filed: Jun. 29, 2021

(65) Prior Publication Data

US 2021/0327007 A1   Oct. 21, 2021

(30) Foreign Application Priority Data

Aug. 28, 2020   (CN) .......................... 202010886753.2

(51) Int. Cl.
G06Q 50/18   (2012.01)
H04L 9/32   (2006.01)

(52) U.S. Cl.
CPC .......... *G06Q 50/18* (2013.01); *H04L 9/3247* (2013.01)

(58) Field of Classification Search
CPC .............................. G06Q 50/18; H04L 9/3247
See application file for complete search history.

(56) References Cited

U.S. PATENT DOCUMENTS

2018/0005186 A1 * 1/2018 Hunn ................... G06F 40/103
2018/0101914 A1 * 4/2018 Samuel ................ G06Q 20/102
(Continued)

FOREIGN PATENT DOCUMENTS

CN   106960165   7/2017
CN   107171794   9/2017
(Continued)

OTHER PUBLICATIONS

D. Mao, F. Wang, Y. Wang and Z. Hao, "Visual and User-Defined Smart Contract Designing System Based on Automatic Coding," in IEEE Access, vol. 7, pp. 73131-73143, 2019, (Year: 2019).*
Zhu, X., & Fan, T. (2019). Research on application of blockchain and identity-based cryptography doi:http://dx.doi.org/10.1088/1755-1315/252/4/042095 (Year: 2019).*
(Continued)

*Primary Examiner* — Maria C Santos-Diaz
(74) *Attorney, Agent, or Firm* — Fish & Richardson P.C.

(57) ABSTRACT

Implementations of the present specification describe a computer-implemented method, medium, and system. In one computer-implemented method, a contract creating request from a requesting user is received by a blockchain node of a blockchain network, where the contract creating request includes creation information of a target electronic contract to be created. A first smart contract is deployed for managing the target electronic contract in a blockchain based on the creation information. The target electronic contract is created according to the creation information and based on the first smart contract. In response to receiving a contract signing request from a signatory user of the target electronic contract, the target electronic contract is signed based on the first smart contract and a second smart contract corresponding to the signatory user, where the second smart contract is a pre-deployed smart contract for managing information associated with the signatory user.

17 Claims, 16 Drawing Sheets

(56) References Cited

U.S. PATENT DOCUMENTS

| | | | | |
|---|---|---|---|---|
| 2019/0207751 A1* | 7/2019 | Harvey | ................ | H04L 67/104 |
| 2019/0243912 A1* | 8/2019 | Duraisamy Soundrapandian | ....... | G06F 9/45558 |
| 2020/0193541 A1 | 6/2020 | Barry et al. | | |
| 2020/0322153 A1* | 10/2020 | Cai | .................... | H04W 12/104 |

FOREIGN PATENT DOCUMENTS

| | | | | |
|---|---|---|---|---|
| CN | 109492983 | | 3/2019 | |
| CN | 109960919 | | 7/2019 | |
| CN | 110046907 | | 7/2019 | |
| CN | 110263581 | | 9/2019 | |
| CN | 111008838 | | 4/2020 | |
| CN | 111127211 | | 5/2020 | |
| CN | 111159304 | * | 5/2020 | ......... G06F 16/2365 |
| CN | 111461917 | | 7/2020 | |
| WO | WO-2021046494 A1 | * | 3/2021 | ......... G06F 16/2358 |

OTHER PUBLICATIONS

Zhong, L., Wu, Q., Xie, J., Guan, Z., & Qin, B. (2019). A secure large-scale instant payment system based on blockchain. Computers & Security, 84, 349-64. doi:http://dx.doi.org/10.1016/j.cose.2019.04.007 (Year: 2019).* bestsign.cn [online], "Contract Management Series," available on or before Sep. 23, 2020, via Internet Archive: Wayback Machine, retrieved on Jul. 19, 2021, retrieved from URL<https://www.bestsign.cn/product-function>, 9 pages (with English machine translation).

Crosby et al., "BlockChain Technology: Beyond Bitcoin," Sutardja Center for Entrepreneurship & Technology Technical Report, Oct. 16, 2015, 35 pages.

esign.cn [online], "Reliable Electronic Contract Platform: Make Every Trust of Users Worth Entrusting", available on or before Sep. 14, 2004 via Internet Archive: Wayback Machine, retrieved on Jul. 19, 2021, retrieved from URL<https://www.esign.cn/>, 16 pages (with English machine translation).

Nakamoto, "Bitcoin: A Peer-to-Peer Electronic Cash System," www.bitcoin.org, 2005, 9 pages.

\* cited by examiner

SIGNING METHODS, APPARATUSES AND DEVICES OF ELECTRONIC CONTRACT

CROSS-REFERENCE TO RELATED APPLICATIONS

This application claims priority to Chinese Patent Application No. 202010886753.2, filed on Aug. 28, 2020, which is hereby incorporated by reference in its entirety.

TECHNICAL FIELD

The present specification relates to the technical field of e-commerce, and in particular, to signing methods, apparatuses and devices of electronic contracts.

BACKGROUND

With the continuous development of e-commerce, electronic contracts have gradually substituted paper contracts with convenience, ease of preservation and other advantages. The current process of signing the electronic contracts is generally completed through third-party electronic contract platforms. However, since the third-party electronic contract platforms are based on a centralized contract management method, there are risks of missing, tampering, etc. of the electronic contracts.

SUMMARY

One or more embodiments of the present specification provide a signing method of an electronic contract, which is applied to a blockchain node. The method includes the following: a contract creating request sent by a requesting user signing a contract is received, where the contract creating request includes creation information of a target electronic contract to be created. A first smart contract for managing the target electronic contract is deployed in a blockchain based on the creation information. The target electronic contract is created according to the creation information based on the first smart contract. If a contract signing request sent by a signatory user of the target electronic contract is received, the target electronic contract is signed based on the first smart contract and a second smart contract corresponding to the signatory user, where the second smart contract is a pre-deployed smart contract for managing the related information about the signatory user.

One or more embodiments of the present specification provide a signing method of an electronic contract, which is applied to a terminal device. The method includes the following: a contract creating request is sent to a blockchain node connecting to a blockchain in response to a contract creation operation of a requesting user signing a contract, where the contract creating request includes creation information of a target electronic contract to be created, so that the blockchain node deploys a first smart contract for managing the target electronic contract in a blockchain based on the creation information, creates the target electronic contract according to the creation information based on the first smart contract, and signs the target electronic contract based on the first smart contract and a second smart contract corresponding to the signatory user according to a contract signing request by a signatory user of the target electronic contract, where the second smart contract is a pre-deployed smart contract for managing the related information about the signatory user. The received contract-creation success information that is sent by the blockchain node is displayed.

One or more embodiments of the present specification provide a signing apparatus of an electronic contract, which is applied to a blockchain node. The apparatus includes a receiving module, configured to receive a contract creating request sent by a requesting user signing a contract, where the contract creating request includes creation information of a target electronic contract to be created. The apparatus further includes a deployment module, configured to deploy a first smart contract for managing the target electronic contract in a blockchain based on the creation information. The apparatus further includes a creation module, configured to create the target electronic contract according to the creation information based on the first smart contract. The apparatus further includes a signing module, and if a contract signing request sent by a signatory user of the target electronic contract is received, the target electronic contract is signed based on the first smart contract and a second smart contract corresponding to the signatory user, where the second smart contract is a pre-deployed smart contract for managing the related information about the signatory user.

One or more embodiments of the present specification provide a signing apparatus of an electronic contract, which is applied to a terminal device. The apparatus includes a sending module, configured to send a contract creating request to a blockchain node connecting to a blockchain in response to a contract creation operation of a requesting user signing a contract, where the contract creating request includes creation information of a target electronic contract to be created, so that the blockchain node deploys a first smart contract for managing the target electronic contract in a blockchain based on the creation information, creates the target electronic contract according to the creation information based on the first smart contract; and sign the target electronic contract based on the first smart contract and a second smart contract corresponding to the signatory user according to a contract signing request by a signatory user of the target electronic contract, where the second smart contract is a pre-deployed smart contract for managing the related information about the signatory user. The apparatus further includes a receiving module, configured to receive contract-creation success information that is sent by the blockchain node. The apparatus further includes a displaying module, configured to display the contract-creation success information.

One or more embodiments of the present specification provide a signing device of an electronic contract. The device includes a processor. The device further includes a memory, configured to store a computer executable instruction. The processor, when executing the computer executable instruction, receives a contract creating request sent by a requesting user signing a contract, where the contract creating request includes creation information of a target electronic contract to be created. A first smart contract for managing the target electronic contract is deployed in a blockchain based on the creation information. The target electronic contract is created according to the creation information based on the first smart contract. If a contract signing request sent by a signatory user of the target electronic contract is received, the target electronic contract is signed based on the first smart contract and a second smart contract corresponding to the signatory user, where the second smart contract is a pre-deployed smart contract for managing the related information about the signatory user.

One or more embodiments of the present specification provide a signing device of an electronic contract. The device includes a processor. The device further includes a memory, configured to store a computer executable instruction. The processor, when executing the computer executable instruction, sends a contract creating request to a blockchain node connecting to a blockchain in response to a contract creation operation of a requesting user signing a contract, where the contract creating request includes creation information of a target electronic contract to be created, so that the blockchain node deploys a first smart contract for managing the target electronic contract in a blockchain based on the creation information, creates the target electronic contract according to the creation information based on the first smart contract, and signs the target electronic contract based on the first smart contract and a second smart contract corresponding to the signatory user according to a contract signing request by a signatory user of the target electronic contract, where the second smart contract is a pre-deployed smart contract for managing the related information about the signatory user. Displaying received contract-creation success information that is sent by the blockchain node.

One or more embodiments of the present specification provide a storage medium. The storage medium is configured to store a computer executable instruction. The processor, when executing the computer executable instruction, receives a contract creating request sent by a requesting user signing a contract, where the contract creating request includes creation information of a target electronic contract to be created. A first smart contract for managing the target electronic contract is deployed in a blockchain based on the creation information. The target electronic contract is created according to the creation information based on the first smart contract. If a contract signing request sent by a signatory user of the target electronic contract is received, the target electronic contract is signed based on the first smart contract and a second smart contract corresponding to the signatory user, where the second smart contract is a pre-deployed smart contract for managing the related information about the signatory user.

One or more embodiments of the present specification provide a storage medium. The storage medium is configured to store a computer executable instruction. The processor, when executing the computer executable instruction, sends a contract creating request to a blockchain node connecting to a blockchain in response to a contract creation operation of a requesting user signing a contract, where the contract creating request includes creation information of a target electronic contract to be created, so that the blockchain node deploys a first smart contract for managing the target electronic contract in a blockchain based on the creation information, creates the target electronic contract according to the creation information based on the first smart contract, and signs the target electronic contract based on the first smart contract and a second smart contract corresponding to the signatory user according to a contract signing request by a signatory user of the target electronic contract, where the second smart contract is a pre-deployed smart contract for managing the related information about the signatory user, and received contract-creation success information that is sent by the blockchain node is displayed.

BRIEF DESCRIPTION OF DRAWINGS

In order to describe the technical solutions of one or more embodiments of the present specification or the technical solutions in the existing technology more clearly, the drawings needed to be used in the embodiments or the existing technology will be simply introduced below. Clearly, the drawings described below are only some embodiments of the present specification. Other drawings may further be obtained by a person of ordinary skill in the art according to these drawings without creative labor.

DESCRIPTION OF EMBODIMENTS

To make a person skilled in the art better understand the technical solutions of one or more embodiments of the present specification, the following describes the technical solutions of one or more embodiments of the present specification clearly and completely with reference to the accompanying drawings in one or more embodiments of the present specification. Clearly, the described embodiments are merely some but not all of the embodiments of the present specification. All other embodiments obtained by a person of ordinary skill in the art based on one or more embodiments of the present specification shall fall within the protection scope of the present specification without creative labor.

Since a current third-party electronic contract platform is based on a centralized contract management method, there are risks of missing, tampering, etc. of an electronic contract, and distrust between a user and the electronic contract platform. Some electronic contract platforms introduce a blockchain, the signed electronic contract is stored in the blockchain to ensure its safety based on the immutability of the blockchain. However, the blockchain is only configured to store the electronic contract in such method, resulting in great reduction in the value of the blockchain. When the blockchain participates in the signature process of the electronic contract, and since the user conducts data interaction with both the third-party electronic contract platform and a blockchain node connecting to the blockchain, operation is complex, and the signature efficiency of the electronic contract is low. The embodiments of the present specification provide a signing method, apparatus, and device of the electronic contract, aiming to simplify a participant and improve the signature efficiency of the electronic contract on the basis of ensuring the validity of the contract.

Figure 1:
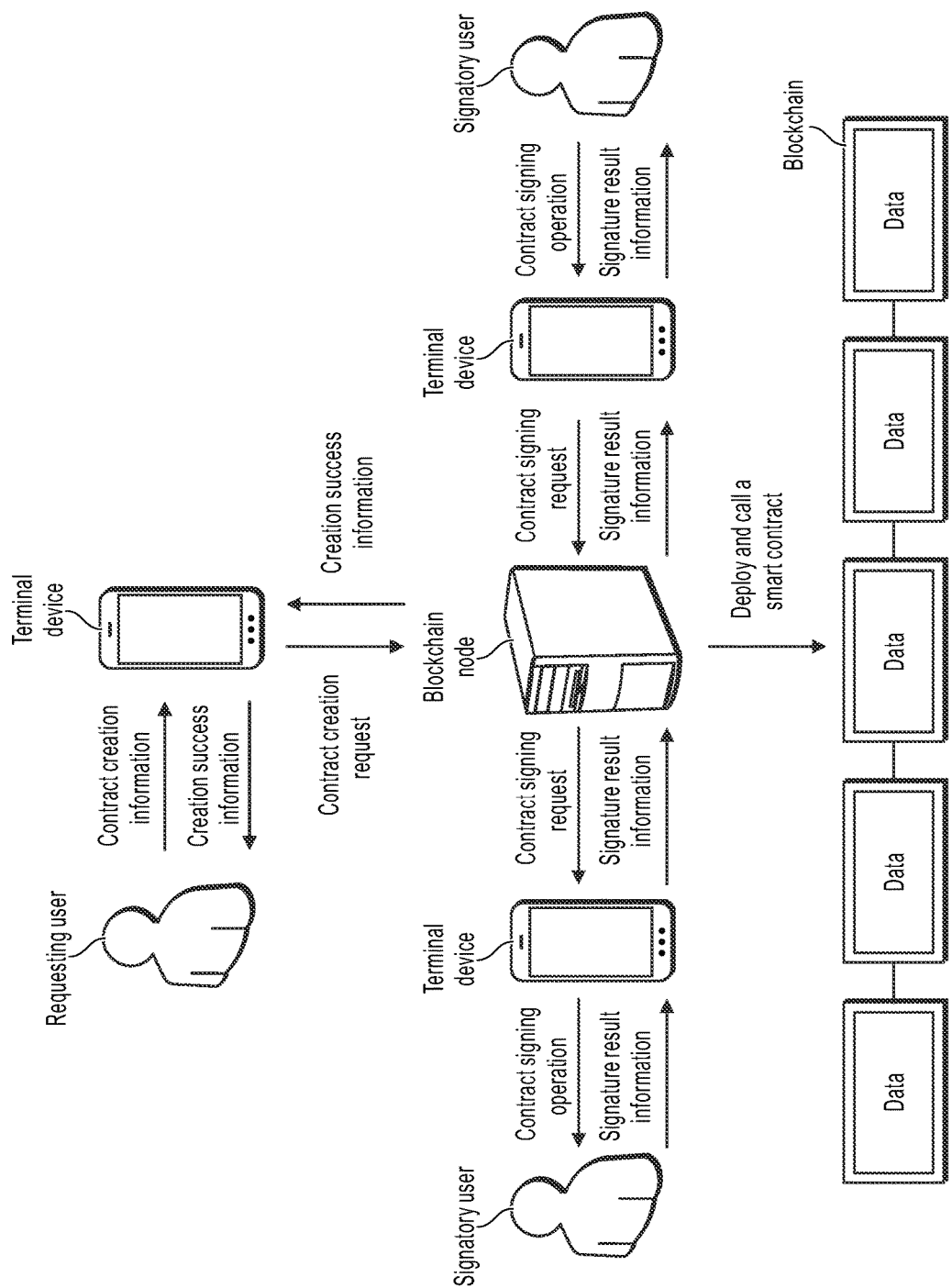
FIG. 1 is a schematic diagram illustrating a first scenario of a signing method of an electronic contract, according to one or more embodiments of the present specification.

FIG. 1 is a schematic diagram illustrating an application scenario of a signing method of an electronic contract, according to one or more embodiments of the present specification, which illustrates that a requesting user signing the contract is not a signatory user. As shown in FIG. 1, the scenario includes a terminal device of the requesting user, terminal devices of one or a plurality of signatory users (taking 2 devices as an example in FIG. 1), and at least one blockchain node connecting to the blockchain (only showing 1 node in FIG. 1), where the terminal device may be a mobile phone, a tablet computer, a desk computer, a portable book-computer, etc. (FIG. 1 only illustrates the mobile phone). Data is stored in the blockchain, such as data of the electronic contract.

Specifically, the terminal device of the requesting user sends a contract creating request to the blockchain node connecting to the blockchain based on creation information of a target electronic contract to be created in response to the contract creation operation of the requesting user. The blockchain node deploys a first smart contract for managing the target electronic contract in the blockchain based on creation information included in the contract creating request, creates the target electronic contract according to the creation information based on the first smart contract, and sends creation success information to the terminal device of the requesting user; and the terminal device displays the received creation success information. When needing to sign the target electronic contract, the signatory user operates the terminal device and the terminal device sends a contract signing request to the blockchain node in response to the contract signing operation of the signatory user. When receiving the contract signing request, the blockchain node signs the target electronic contract based on the first smart contract and a second smart contract corresponding to the signatory user, and sends signature result information to the terminal device of the signatory user, where the second smart contract is a pre-deployed smart contract for managing the related information about the signatory user. The terminal device of the signatory user displays the received signature result information.

Figure 2:
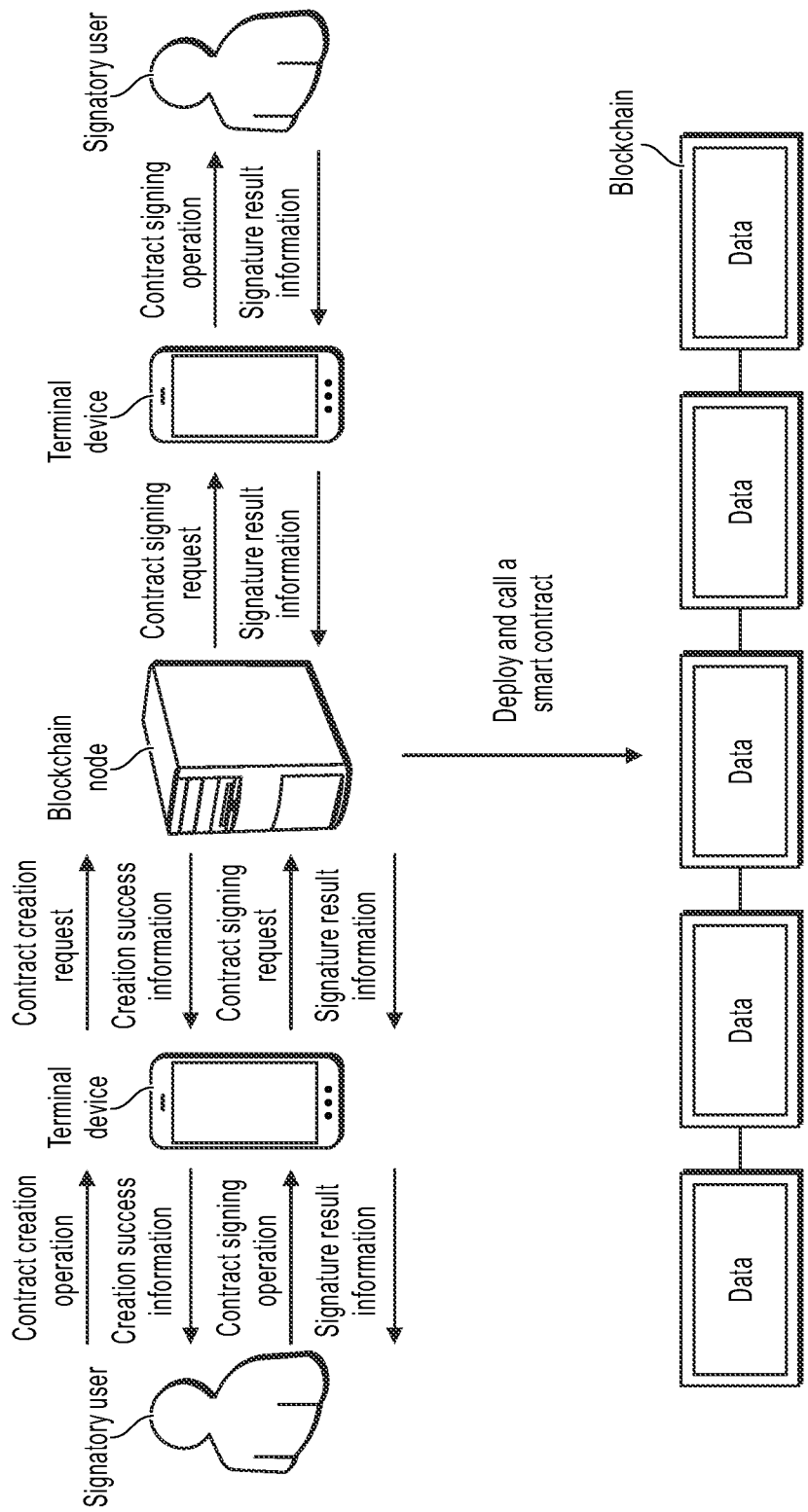
FIG. 2 is a schematic diagram illustrating a second scenario of a signing method of an electronic contract, according to one or more embodiments of the present specification.

Further, the requesting user may also be the signatory user. As shown in FIG. 2, the scenario includes terminal devices of a plurality of signatory users (taking 2 devices as an example in FIG. 2) and at least one blockchain node connecting to the blockchain (only showing 1 node in FIG. 2), where one signatory user operates the terminal device to send the contract creating request to the blockchain node, and after creating the target electronic contract based on the previously described method, the blockchain node sends creation success information to the terminal device of the signatory user; each signatory user operates its terminal device to send the contract signing request to the blockchain node; and the blockchain node signs the target electronic contract and sends the signature result information to the corresponding terminal device in the previously described method based on the received contract signing request.

Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Figure 3:
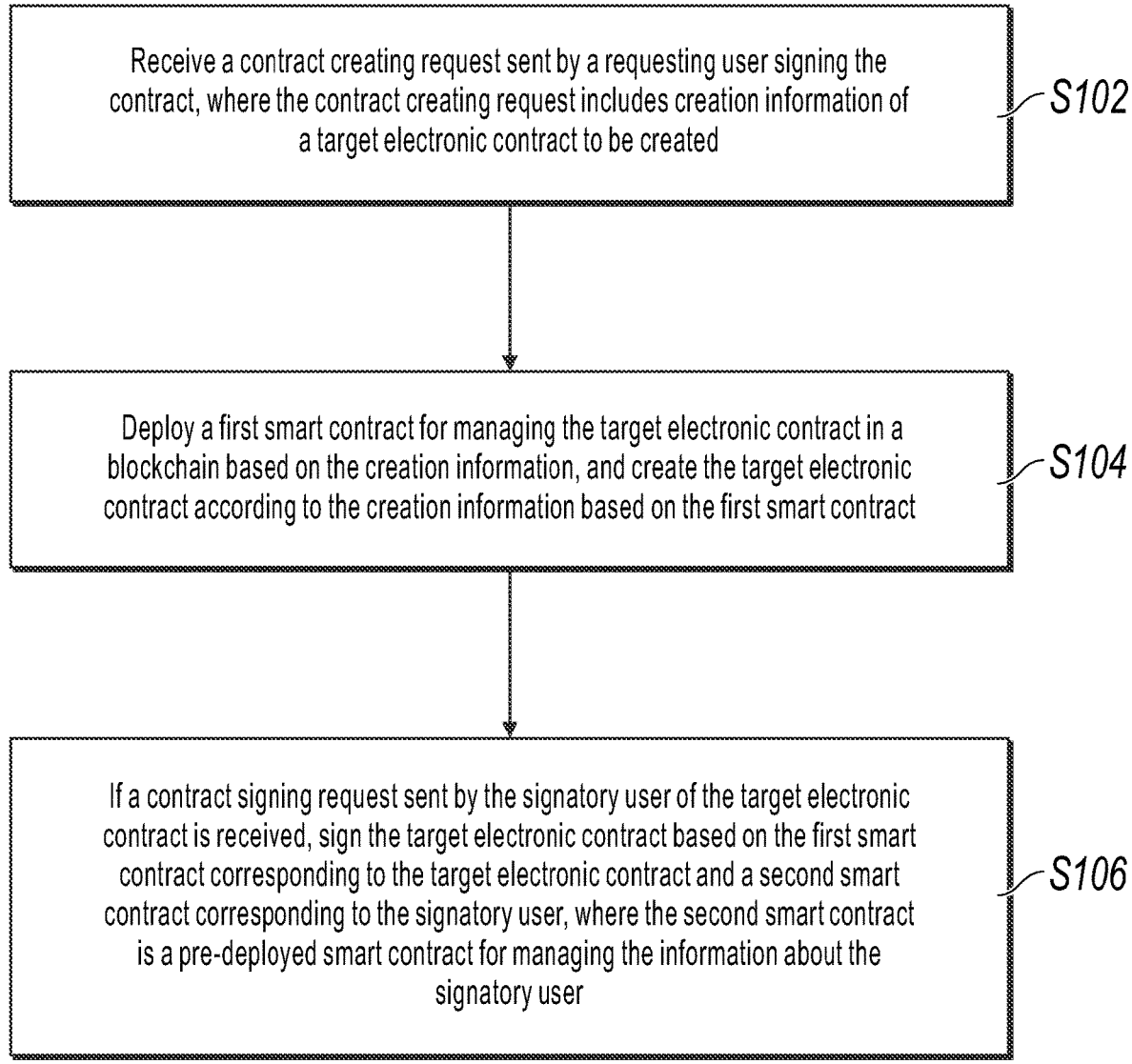
FIG. 3 is a first schematic flowchart illustrating a signing method of an electronic contract, according to one or more embodiments of the present specification.

Based on the previously described application scenario, one or more embodiments of the present specification provide a signing method of the electronic contract. FIG. 3 is a schematic flowchart illustrating a signing method of an electronic contract, according to one or more embodiments of the present specification. The method in FIG. 3 can be executed by the blockchain node in FIG. 1. As shown in FIG. 3, the method includes the following steps:

Step S102. The contract creating request sent by the requesting user signing the contract is received, where the contract creating request includes the creation information of the target electronic contract to be created.

Optionally, the requesting user operates its terminal device to select target template information corresponding to the target electronic contract to be created in template information (e.g., template name, etc.) of a plurality of predetermined contract templates, and edit user identification information of each signatory user of the target electronic contract to be created; and the terminal device determines template identification information of the contract template corresponding to the obtained target template information, and the user identification information of each signatory user as creation information, and sends the contract creating request to the blockchain node based on the creation information. Alternatively, the requesting user operates its terminal device to upload the contract template corresponding to the target electronic contract to be created, and edit the user identification information of each signatory user of the target electronic contract to be created; and the terminal device determines the obtained contract template and the user identification information of each signatory user as creation information, and sends the contract creating request to the blockchain node based on the creation information.

It is worthwhile to note that the signatory user may be either an individual or an enterprise; and when the signatory user is the enterprise, the signatory user may be either a principal or a designated employee of the enterprise. The requesting user may be or not be the signatory user of the target electronic contract. As an example, the signatory is an enterprise 1 and an enterprise 2; the requesting user may be either an employee designated by the enterprise 1 or an employee designated by the enterprise 2, or a service agency user for providing law services for the enterprise 1 or the enterprise 2, etc. and the signatory user is a principal of the enterprise 1 or the enterprise 2. As another example, the signatory user is a user 1 or a user 2; and the user 1, as the requesting user, sends the contract creating request to the blockchain node, or the user 2, as the requesting user, sends the contract creating request to the blockchain node.

Step S104. The first smart contract for managing the target electronic contract in the blockchain is deployed based on the creation information, and the target electronic contract is created according to the creation information based on the first smart contract.

In order to ensure that the target electronic contract can be accessed only by the requesting user, the signatory user, and other relevant users, in the embodiments of the present specification, the corresponding first smart contract is deployed for each target electronic contract to be created, and the corresponding target electronic contract is created and signed based on the first smart contract.

Step S106. If the contract signing request sent by the signatory user of the target electronic contract is received, the target electronic contract is signed based on the first smart contract corresponding to the target electronic and the second smart contract corresponding to the signatory user, where the second smart contract is a pre-deployed smart contract for managing the related information about the signatory user.

Optionally, after the target electronic contract is created successfully, the blockchain node sends prompt information to each signatory user of the target electronic contract, so that each signatory user of the target electronic contract sends the contract signing request to the blockchain node based on the prompt information to sign the contract; for example, the blockchain node sends the prompt information to a corresponding registered account based on the user identification information of each signatory user of the target electronic contract; and when logging in the registered account, the signatory user sends the contract signing request to the blockchain node based on the received prompt information. Alternatively, after the target electronic contract is created successfully, the requesting user sends the prompt information to each signatory user of the target electronic contract, so that each signatory user of the target electronic contract sends the contract signing request to the blockchain node based on the prompt information. In terms of the method for the signatory user to send the contract signing request, the present specification does not make specific limitation. The method can be specified based on needs in actual applications.

Further, information of the signatory user includes identity information, signature information, a public key, etc. of the signatory user. When the signatory user is the individual, the identity information of the signatory user includes a name, an ID card number, etc.; and information of the signatory user can further include contact information (e.g., mobile phone number), a family address, a work unit, etc. of the signatory user. When the signatory user is the enterprise, the identity information of the signatory user includes an enterprise name, a business license number, etc.; and information of the signatory user can further include location information, contact information (e.g., mobile telephone number, fax, etc.), etc. of the enterprise. It is worthwhile to note that information of the signatory user can be specified based on needs in actual applications.

In one or more embodiments of the present specification, the blockchain node, when receiving the contract creating request sent by the requesting user, deploys the first smart contract corresponding to the target electronic contract to be created in the blockchain, and creates the target electronic contract based on the deployed first smart contract; signs, when receiving the contract signing request sent by the signatory user of the target electronic contract, the target electronic contract based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Figure 4:
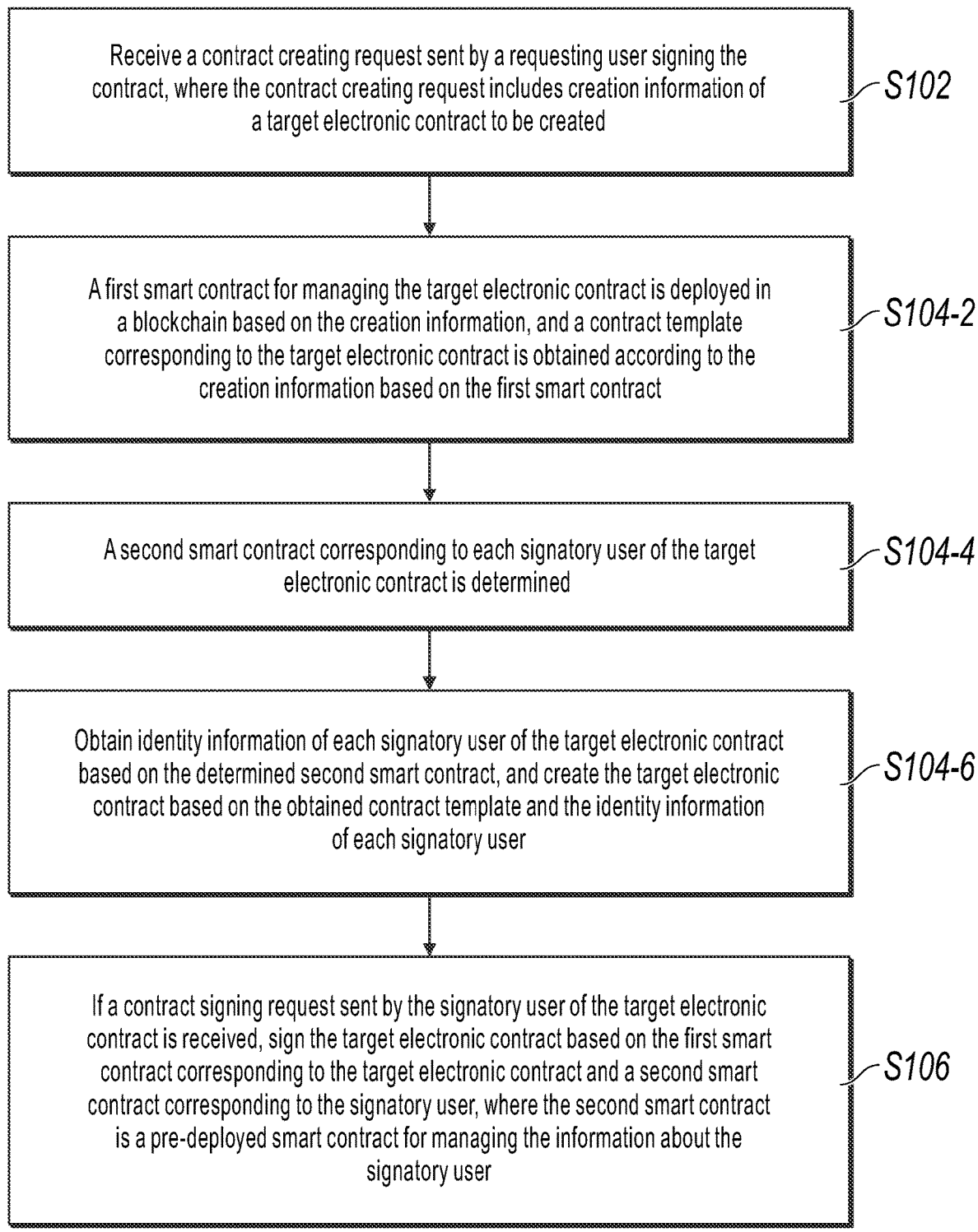
FIG. 4 is a second schematic flowchart illustrating a signing method of an electronic contract, according to one or more embodiments of the present specification.

Considering that the same signatory user often has a plurality of different electronic contracts, in order to improve the creation efficiency and signature efficiency of the electronic contract, in one or a plurality of embodiments of the present specification, the corresponding second smart contract is pre-deployed for each signatory user, and the information of the corresponding signatory user is managed through the second smart contract, e.g., the identity information of the signatory user, etc.; and the target electronic contract is created based on the first smart contract and the second smart contract. Specifically, as shown in FIG. 4, the step S104 includes the following:

Step S104-2. The first smart contract for managing the target electronic contract is deployed in the blockchain based on the creation information, and the contract template corresponding to the target electronic contract is obtained according to the creation information based on the first smart contract.

In order to better satisfy the experience of creating the electronic contract of the user, in one or more embodiments of the present specification, a plurality of contract templates are set in advance, and an association relationship between the contract template and the template identification information of the contract template is established, which is stored in the blockchain, or is included in the first smart contract. Further, considering that different requesting users have different creation needs on the electronic contract, and when a plurality of predetermined contract templates cannot satisfy the needs of the requesting user, the requesting user can also upload the contract template of the target electronic contract to be created through the terminal device. Correspondingly, in step S104-2, the contract template corresponding to the target electronic contract is obtained based on the creation information, including the following: the contract template is obtained from the creation information, which is determined as the contract template corresponding to the target electronic contract; or the associated contract template is obtained from the association relationship between the predetermined template identification information and the contract template based on the template identification information in the creation information, and the obtained contract template is determined as a contract template corresponding to the target electronic contract to be created.

Step S104-4. The second smart contract corresponding to each signatory user of the target electronic contract is determined.

Step S104-6. The identity information of each signatory user of the target electronic contract is obtained based on the determined second smart contract, and the target electronic contract is created based on the obtained contract template and the identity information of each signatory user; specifically, each second smart contract that is determined is called, and the identity information of the corresponding signatory user is obtained; the obtained contract template is identified based on an identification algorithm of a predetermined addition position to obtain the addition position where the identity information of the signatory user is added; and the obtained identity information of each signatory user is added to the identified addition position to obtain the target electronic contract to be signed, i.e., the initial target electronic contract. Alternatively, the requesting user specifies the addition position of the identity information of each signatory user, and the blockchain node obtains addition position information for adding the identity information of the signatory user, and adds the obtained identity information of each signatory to the addition position corresponding to the addition position information, thereby obtaining the target electronic contract to be signed.

The corresponding second smart contract can be called directly by pre-deploying the second smart contract corresponding to each signatory user to obtain the identity information of the corresponding signatory user, thereby creating the target electronic contract based on the obtained identity information, and the requesting user does not need to provide the identity information of each signatory user when requesting to create the target electronic contract every time. Therefore, the operation of the requesting user is reduced, and the creation efficiency of the target electronic contract is improved.

Figure 5:
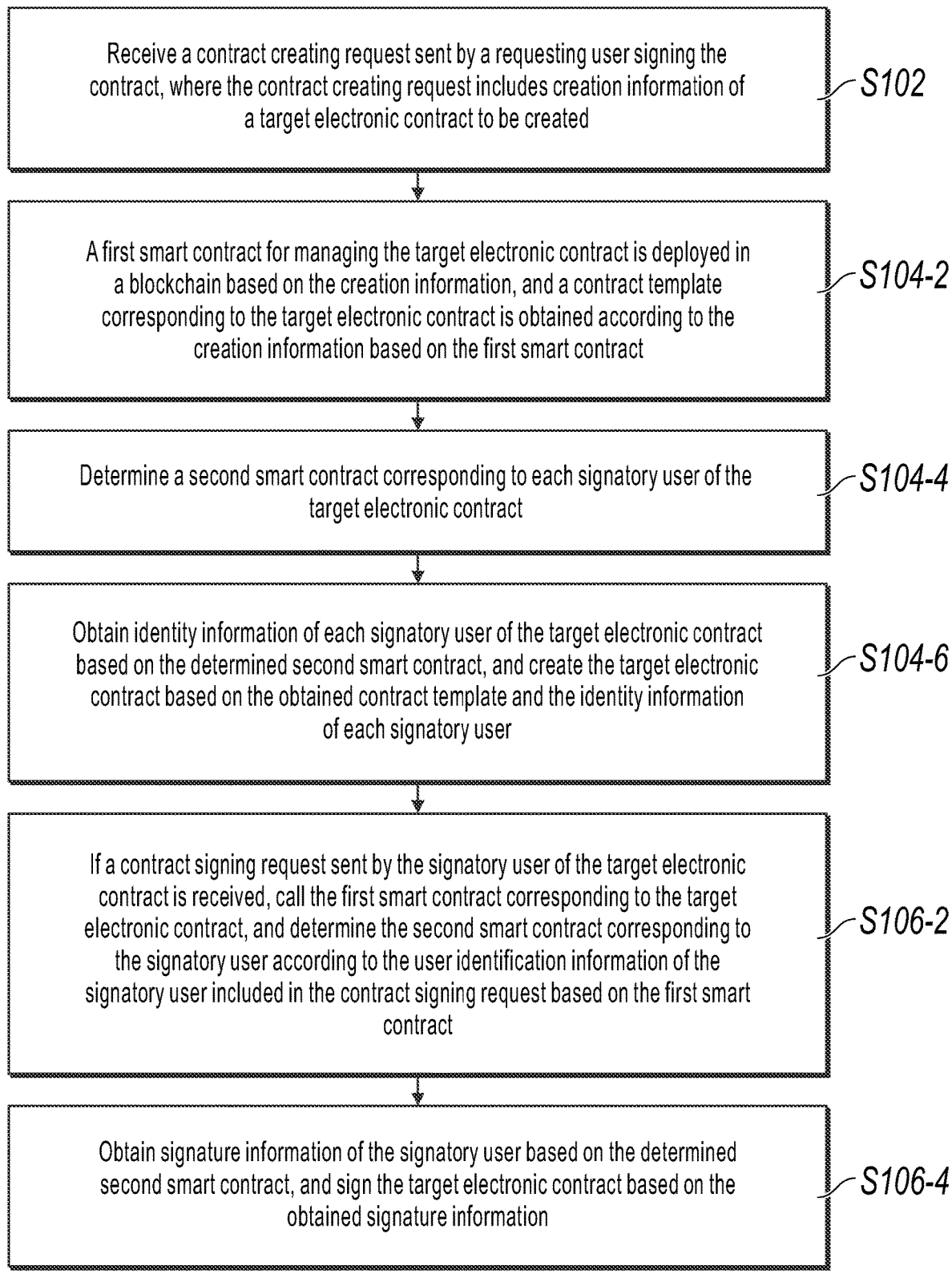
FIG. 5 is a third schematic flowchart illustrating a signing method of an electronic contract, according to one or more embodiments of the present specification.

Further, in order to improve the signature efficiency of the electronic contract, without the need for the signatory user to provide signature information when signing every time, in one or more embodiments of the present specification, the second smart contract also manages the signature information of the corresponding signatory user. Specifically, as shown in FIG. 5, step S106 includes the following:

Step S106-2. If the contract signing request sent by the signatory user of the target electronic contract is received, the first smart contract corresponding to the target electronic contract is called, and the second smart contract corresponding to the signatory user is determined according to the user identification information, included in the contract signing request, of the signatory user based on the first smart contract.

Step S106-4. The signature information of the signatory user is obtained based on the determined second smart contract, and the target electronic contract is signed based on the obtained signature information; Specifically, the signature information of the corresponding signatory user is obtained by calling the determined second smart contract; the target electronic contract corresponding to the contract signing request is identified based on a predetermined signature position identification algorithm to obtain signature position information; and the target electronic contract is signed based on the obtained signature information and the signature position information to add the signature information to the signature position corresponding to the signature position information. Where, the signature position identification algorithm can be specified in based on needs in actual applications, and the present specification does not make specific limitation.

Therefore, when the contract signing request sent by the signatory user is received, the signature information of the signatory user is obtained automatically for signing by determining the second smart contract corresponding to the signatory user based on the determined second smart contract, without the need for the signatory user to provide the signature information when signing the electronic contract every time, thereby improving the signature efficiency of the electronic contract. Moreover, the target electronic contract corresponding to the contract signing request is identified based on the predetermined signature position identification algorithm to obtain the signature position information, and is signed based on the obtained signature position information, thereby improving the accuracy of signature.

Figure 6:
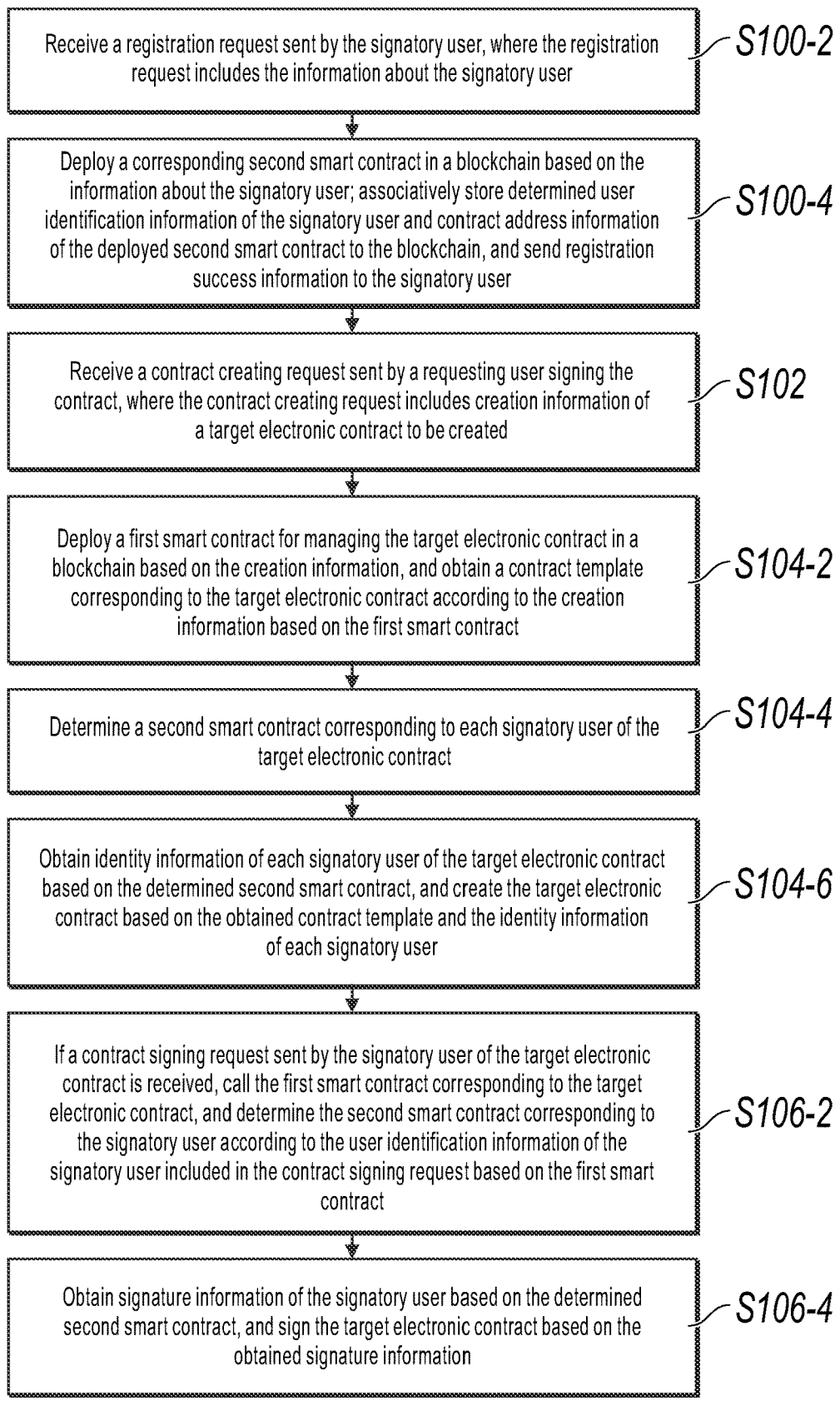
FIG. 6 is a fourth schematic flowchart illustrating a signing method of an electronic contract, according to one or more embodiments of the present specification.

Further, as shown in FIG. 6, corresponding to steps S104-2 to S104-4 and step S106-2 and step S106-4, before step S102, the method can further include:

Step S100-2. A registration request sent by the signatory user is received, where the registration request includes information about the signatory user; Specifically, the signatory user operates its terminal device to edit the identity information, the signature information, etc. of the signatory user, and clicks, after editing, a relevant control (e.g., a determination control, etc.) to submit the edited information to the terminal device; and the terminal device of the signatory user sends the registration request to the blockchain node based on the obtained identity information, the signature information, etc. in response to the registration of the signatory user. It is worthwhile to note that when the signatory user is the enterprise, the registration request can be sent by a relevant principal to the blockchain node.

Step S100-4. The corresponding second smart contract is deployed in the blockchain based on information of the signatory user; the determined user identification information of the signatory user and contract address information of the deployed second smart contract are associatively stored in the blockchain, and registration success information is sent to the signatory user, where the user identification information of the signatory user can be generated by the terminal device of the signatory user based on the registration of the signatory user, and correspondingly, the registration request includes the user identification information of the signatory user; and the blockchain node obtains the user identification information of the signatory user from the registration request, and stores the obtained user identification information of the signatory user and the contract address information of the deployed second smart contract to the blockchain associatively. Alternatively, the user identification information of the signatory user is identification information that the blockchain node distributes for the signatory user when receiving the registration request; and the blockchain node stores the distributed user identification information of the signatory user and the contract address information of the deployed smart contract to the blockchain associatively.

Therefore, the blockchain node deploys, when receiving the registration request sent by the signatory user, the second smart contract corresponding to the signatory user, and manages information of the signatory user based on the second smart contract; the blockchain node can obtain, when creating and signing different target electronic contracts, the identity information, the signature information, etc. of the signatory user automatically based on the second smart contract, without the need for the signatory user to provide corresponding information every time, thereby reducing the operation of the signatory user, and improving the creation efficiency and signature efficiency of the target electronic contract.

Figure 7:
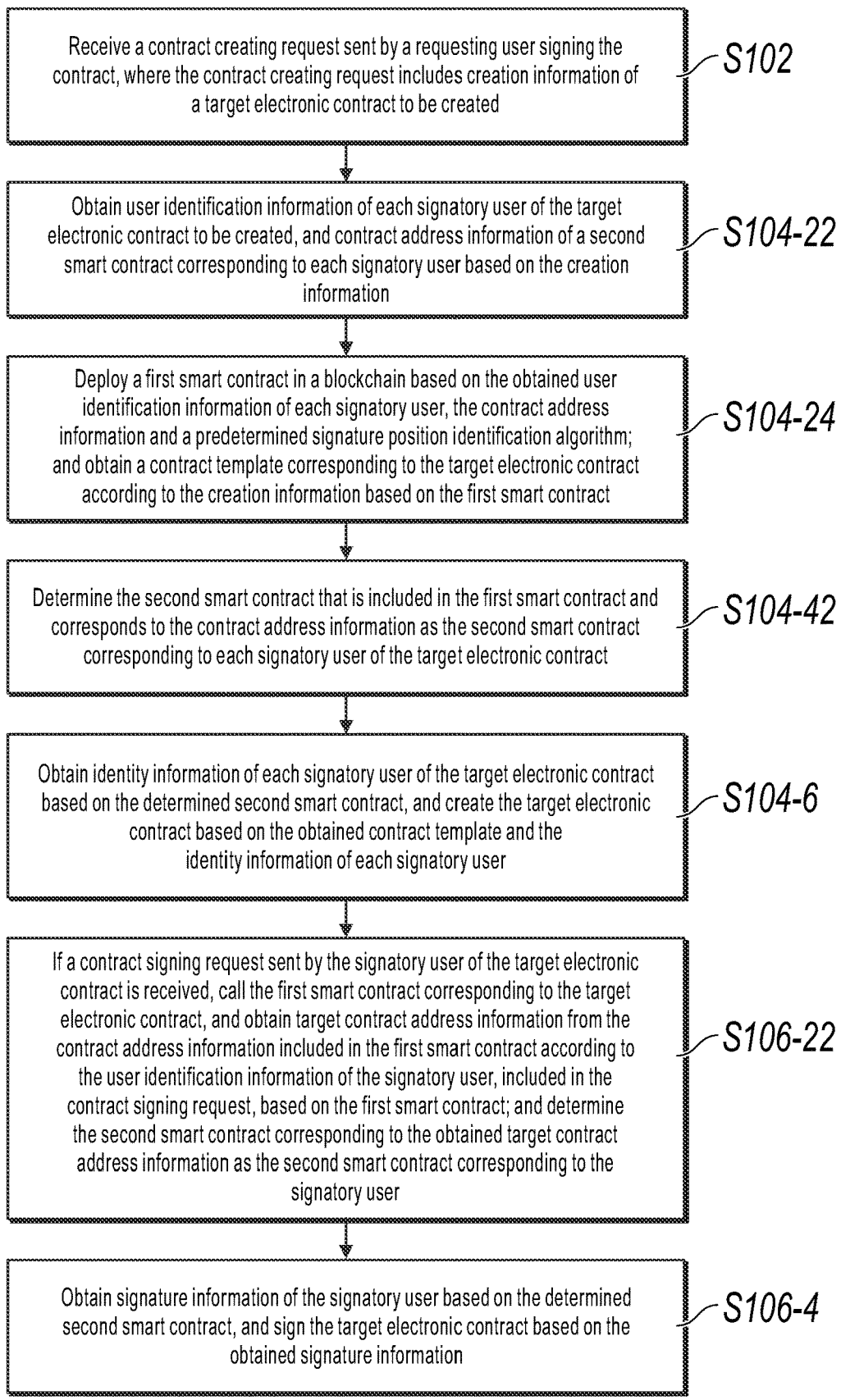
FIG. 7 is a fifth schematic flowchart illustrating a signing method of an electronic contract, according to one or more embodiments of the present specification.

Further, in order to ensure that the blockchain node can determine the corresponding second smart contract quickly when creating and signing the electronic contract, in one or more embodiments of the present specification, the first smart contract is deployed based on the contract address information of the second smart contract corresponding to each signatory user of the target electronic contract to be created. Specifically, as shown in FIG. 7, the previous step S104-2 can include the following steps S104-22 to S104-24:

Step S104-22. The user identification information of each signatory user of the target electronic contract to be created, and the contract address information of the second smart contract corresponding to each signatory user are obtained based on the creation information.

Optionally, the registration success information sent by the blockchain node to the signatory user includes the contract address information of the corresponding second smart contract; the requesting user can obtain the user identification information and the corresponding contract address information of the signatory user privately from each signatory user of the target electronic contract to be created, or sends an information obtaining request to each signatory user of the target electronic contract to be created through the terminal device, and receives the user identification information and the corresponding contract address information of the signatory user, sent by each signatory user; and correspondingly, the creation information can include the user identification information of each signatory user of the target electronic contract to be created and the contract address information of the corresponding second smart contract. Step S104-22 can include: the blockchain node obtains the user identification information of each signatory user of the target electronic contract to be created, and the contract address information of the second smart contract corresponding to each signatory user from the creation information.

Alternatively, the creation information includes the user identification information of each signatory user of the target electronic contract to be created; correspondingly, step S104-22 can include: the blockchain node obtains the user identification information of each signatory user of the target electronic contract to be created from the creation information, and obtain associated target contract address information from the association relationship between the user identification information and the contract address information of the signatory user, stored in the blockchain, based on the obtained user identification information of the signatory user; and the obtained target contract address information is determined as the contract address information corresponding to the second smart contract corresponding signatory user.

Step S104-24. The first smart contract is deployed in the blockchain based on the obtained user identification information of each signatory user, the contract address information, and the predetermined signature position identification algorithm; and the contract template corresponding to the target electronic contract is obtained according to the creation information based on the first smart contract.

Specifically, the association relationship between the obtained user identification information and the contract address information of each signatory user is established, the first smart contract is deployed in the blockchain based on the association relationship and the predetermined signature position identification algorithm; and the contract template corresponding to the target electronic contract is obtained according to the creation information based on the first smart contract.

As shown in FIG. 7, step S104-4, corresponding to steps S104-22 to S104-24, includes the following steps S104-42:

Step S104-42. The second smart contract corresponding to the contract address information included in the first smart contract is determined as a second smart contract corresponding to each signatory user of the target electronic contract.

Further, as shown in FIG. 7, step S106-2, corresponding to steps S104-22 to S104-24 and step S104-42, includes the following step S106-22:

Step S106-22. If the contract signing request sent by the signatory user of the target electronic contract is received, the first smart contract corresponding to the target electronic contract is called, and the target contract address information is obtained from the contract address information included in the first smart contract according to the user identification information, included in the contract signing request, of the signatory user based on the first smart contract; and the second smart contract corresponding to the obtained target contract address information is determined as a second smart contract corresponding to the signatory user.

Specifically, the associated target contract address information is obtained from the association relationship between the user identification information, included in the first smart contract, of the signatory user and the contract address information, according to the user identification information, included in the contract signing request, of the signatory user based on the first smart contract; and the second smart contract corresponding to the obtained target contract address information is determined as a second smart contract corresponding to the signatory user.

Therefore, the first smart contract is deployed based on the contract address information of the second smart contract corresponding to each signatory user of the target electronic contract, so that the corresponding second smart contract can be determined directly based on the association relationship between the user identification information and the contract address information of the signatory user in the first smart contract, without obtaining a contract address from the association relationship between the user identification information, stored in the blockchain, of a plurality of signatory users and the contract address information, thereby determining the corresponding second smart contract; and since the number of the association relationships included in the first smart contract is far smaller than that of the association relationships stored in the blockchain, the determination rate of the second smart contract is improved, thereby improving the creation efficiency and signature efficiency of the target electronic contract.

Further, considering that some signatory users may have a plurality of electronic contracts, the association relationship between the user identification information of the signatory user and the contract address information of the second smart contract will be stored in different first smart contracts repeatedly in the previously described method for deploying the first smart contract based on the contract address information, which will result in the excessive occupation of storage space. In one or more embodiments of the present specification, as shown in FIG. 8, step S104-2 can further include the following step S104-26:

Step S104-26. The user identification information of each signatory user of the target electronic contract to be created is obtained from the creation information, and the first smart contract is deployed based on the obtained user identification information of the signatory user and the predetermined signature position identification algorithm.

Figure 8:
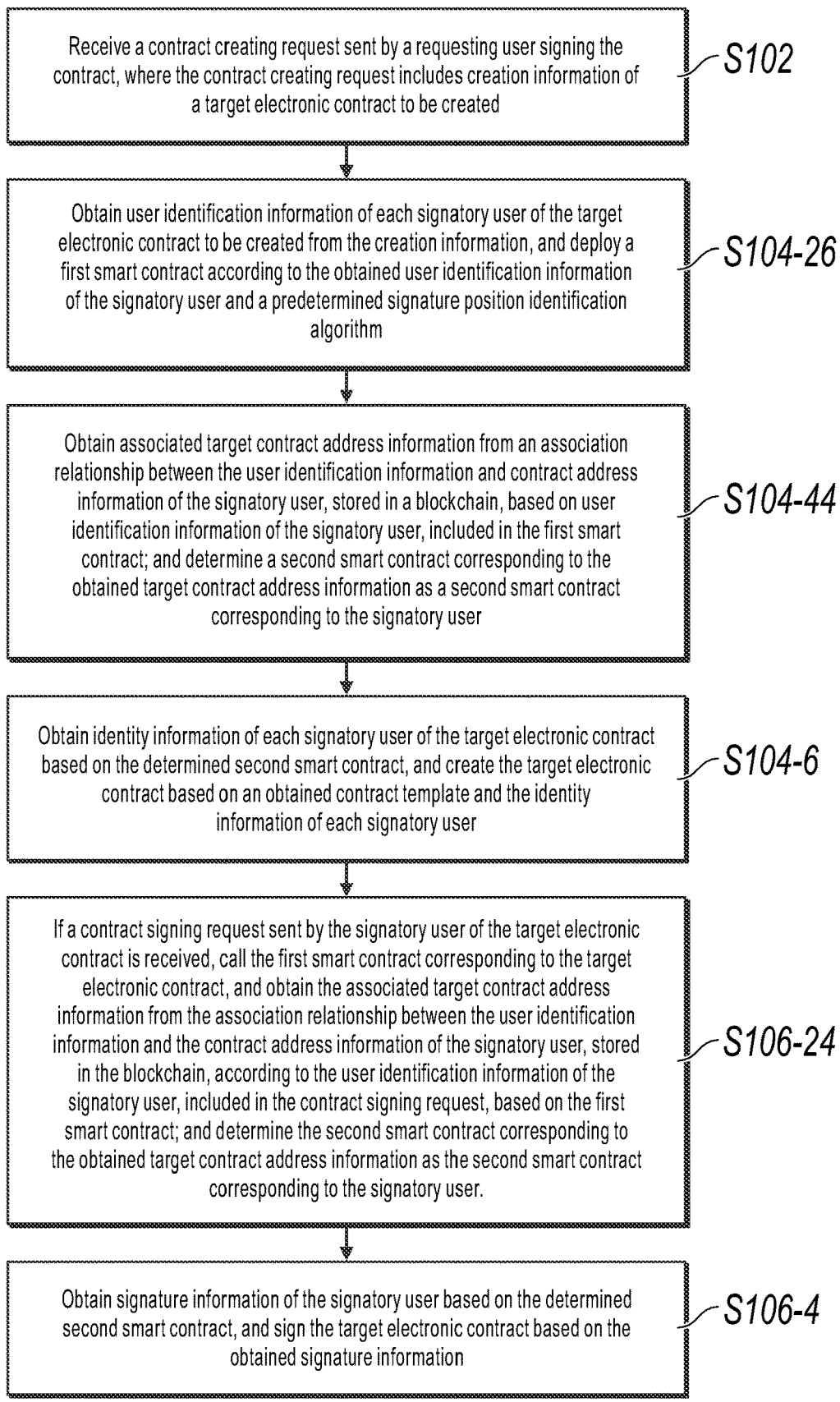
FIG. 8 is a sixth schematic flowchart illustrating a signing method of an electronic contract, according to one or more embodiments of the present specification.

As shown in FIG. 8, step S104-4, corresponding to step S104-26, includes the following step S104-44:

Step S104-44. The associated target contract address information is obtained from the association relationship between the user identification information and the contract address information, stored in the blockchain, of the signatory user based on the user identification information, included in the first smart contract, of the signatory user; and the second smart contract corresponding to the obtained target contract address information is determined as a second smart contract corresponding to the signatory user.

Further, as shown in FIG. 8, step S106-2, corresponding to step S104-26 and step S104-44, includes the following step S106-24:

Step S106-24. If the contract signing request sent by the signatory user of the target electronic contract is received, the first smart contract corresponding to the target electronic contract is called, and the associated target contract address information is obtained from the association relationship between the user identification information and the contract address information, stored in the blockchain, of the signatory user according to the user identification information, included in the contract signing request, of the signatory user based on the first smart contract; and the second smart contract corresponding to the obtained target contract address information is determined as a second smart contract corresponding to the signatory user.

Therefore, the first smart contract is deployed based on the user identification information of each signatory user of the target electronic contract, and the associated target contract address information is obtained from the association relationship between the user identification information and the contract address information, stored in the blockchain, of the signatory user based on the user identification information of the signatory user during the creation and signing of the target electronic contract, thereby determining and processing the corresponding second smart contract, without repeatedly storing the association relationship between the user identification information of the signatory user and the contract address information of the second smart contract in a plurality of first smart contracts corresponding to a plurality of electronic contracts of the signatory user. Therefore, the excessive occupation of the storage space is alleviated, and the utilization rate of the storage space of the blockchain is improved.

Figure 9:
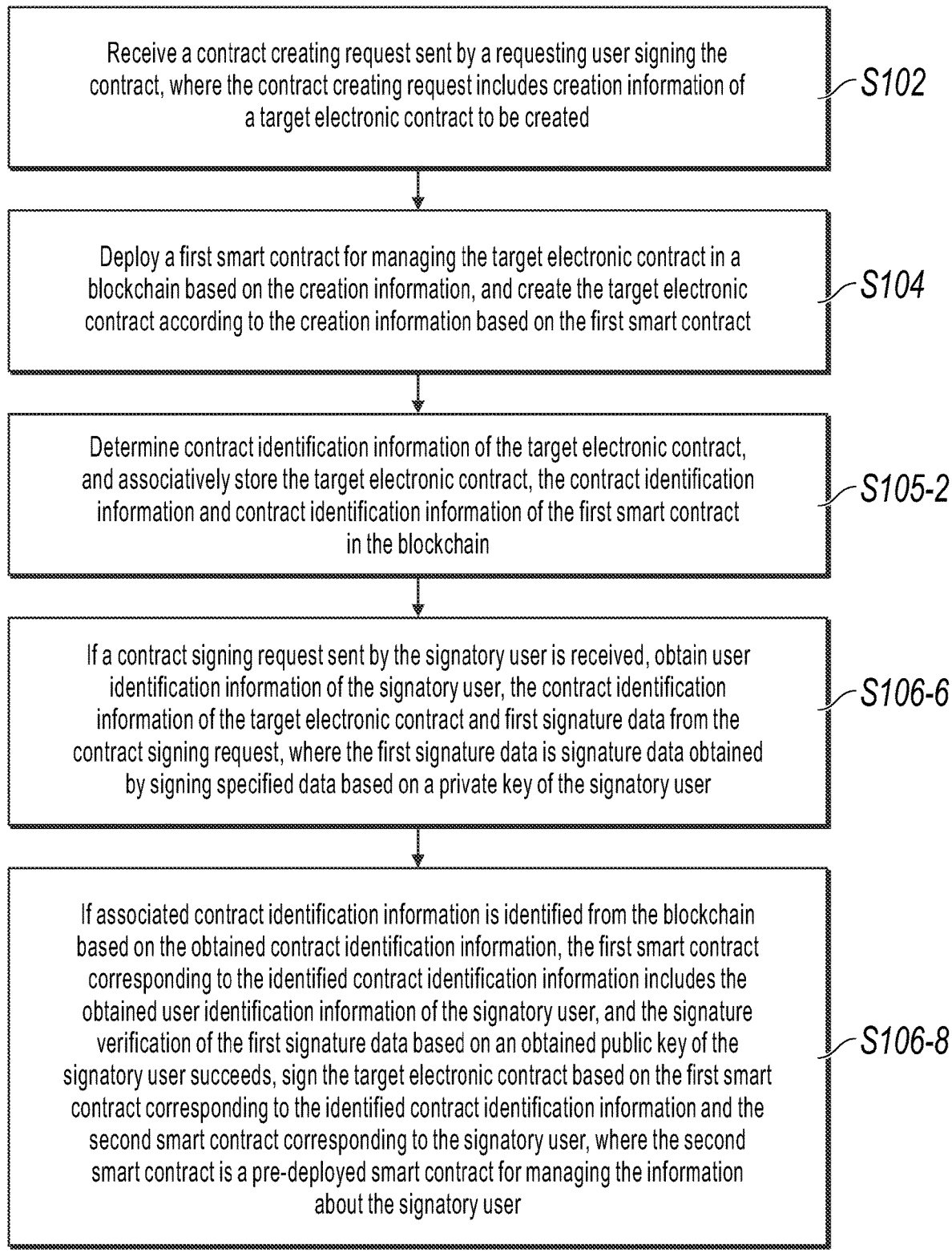
FIG. 9 is a seventh schematic flowchart illustrating a signing method of an electronic contract, according to one or more embodiments of the present specification.

Further, in order to determine the corresponding first smart contract quickly and ensure that the contract signing request is sent by the corresponding signatory user when the contract signing request sent by the signatory user is received, in one or more embodiments of the present specification, as shown in FIG. 9, after the step S104, the method further includes the following:

Step S105-2. Contract identification information of the target electronic contract is determined, and the target electronic contract, the contract identification information and contract identification information of the first smart contract are associatively stored in the blockchain; correspondingly, as shown in FIG. 9, step 106 can include the following steps S106-6 and S106-8:

Step S106-6. If the contract signing request sent by the signatory user is received, the user identification information of the signatory user, the contract identification information of the target electronic contract and first signature data are obtained from the contract signing request, where the first signature data is signature data obtained by signing specified data based on a private key of the signatory user; Specifically, when signing the contract, the signatory user operates its terminal device to select the signed target electronic contract in a contract signing interface, and operate (click or double click, etc.) a signature control in the contract signing interface, and the terminal device determines the contract identification information of the target electronic contract to be signed in response to the contract signing operation of the signatory user, signs the specified data based on the predetermined private key of the signatory user to obtain the signature data, and sends the contract signing request to the blockchain node based on the user identification information of the signatory user, the contract identification information of the target electronic contract to be signed and the signature data, where the specified data can be set in actual applications based on needs, for example, the specified data is the user identification information of the signatory user, the contract identification information of the target electronic contract to be signed, etc.

Step S106-8. If associated contract identification information is identified from the blockchain based on the obtained contract identification information, it is determined that the first smart contract corresponding to the identified contract identification information includes the obtained user identification information of the signatory user, and the signature verification of the first signature data based on an obtained public key of the signatory user succeeds, the target electronic contract is signed based on the first smart contract corresponding to the identified contract identification information and the second smart contract corresponding to the signatory user, where the second smart contract is a pre-deployed smart contract for managing the related information about the signatory user.

Specifically, the blockchain node determines whether the associated contract identification information is obtained from the association relationship between the contract identification information stored in the blockchain and the contract identification information based on the obtained contract identification information; if the associated contract identification information is not obtained, the blockchain node sends signature failure information to the signatory user; if the associated contract identification information is obtained, the blockchain node determines whether the user identification information of the signatory user is included in the first smart contract corresponding to the obtained contract identification information, and if the user identification information of the signatory user is not included in the first smart contract corresponding to the obtained contract identification information, the blockchain node determines the second smart contract corresponding to the signatory user based on the user identification information of the signatory user, obtains the public key of the signatory user by calling the determined second smart contract, and conducts signature verification on the first signature data based on the obtained public key; if the signature verification is accepted, the target electronic contract is signed based on the first smart contract corresponding to the identified contract identification information and the second smart contract corresponding to the signatory user; and if the signature verification is rejected, the signature failure information is sent to the signatory user.

It is worthwhile to note that if signature is not required since the target electronic contract is only a text, the blockchain node, after approving the signature verification of the signature data, determines that the corresponding signatory user signs the target electronic contract successfully, stores the signature data, the user identification information of the signatory user, etc. to the first smart contract associatively, or stores them to the blockchain associatively.

Since the private key of the signatory user is only held by the signatory user, the contract signing request is sent on a voluntary basis of the signatory user through the signature verification of the first signature data; the authenticity of the target electronic contract is ensured by verifying the contract identification information and the user identification information, included in the contract signing request, of the signatory user; and the signatory user has the right to sign the target electronic contract, thereby ensuring the effective signature of the target electronic contract.

Figure 10:
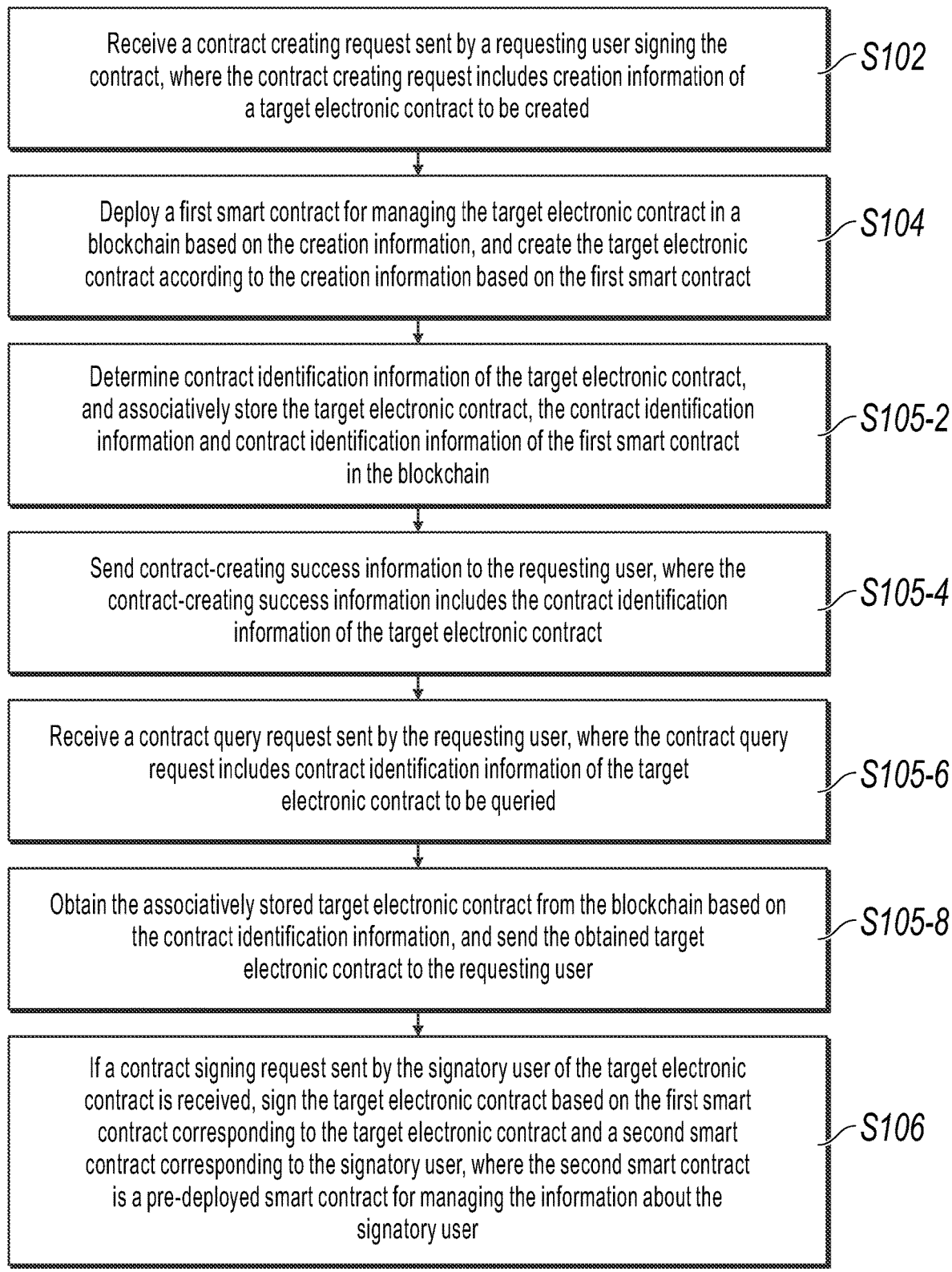
FIG. 10 is an eighth schematic flowchart illustrating a signing method of an electronic contract, according to one or more embodiments of the present specification.

Further, in order to ensure the accuracy of the target electronic contract, the blockchain node further can send contract-creation success information to the requesting user based on the contract identification information of the created target electronic contract, so that the requesting user identifies the corresponding target electronic contract based on the contract identification information, and confirms whether the target electronic contract is accurate. Specifically, as shown in FIG. 10, after the step S104, the method includes, on the basis of including step S105-2, the following steps S105-4 to S105-8:

Step S105-4. The contract-creation success information is sent to the requesting user, where the contract-creation success information includes the contract identification information of the target electronic contract.

Step S105-6. A contract identification request sent by the requesting user is received, where the contract identification request includes contract identification information of a target electronic contract to be identified.

Step S105-8. The associatively stored target electronic contract is obtained from the blockchain based on the contract identification information, and the obtained target electronic contract is sent to the requesting user.

The accuracy of the created target electronic contract is ensured by providing an identification function of the target electronic contract, thereby ensuring the validity of the target electronic contract.

Figure 11:
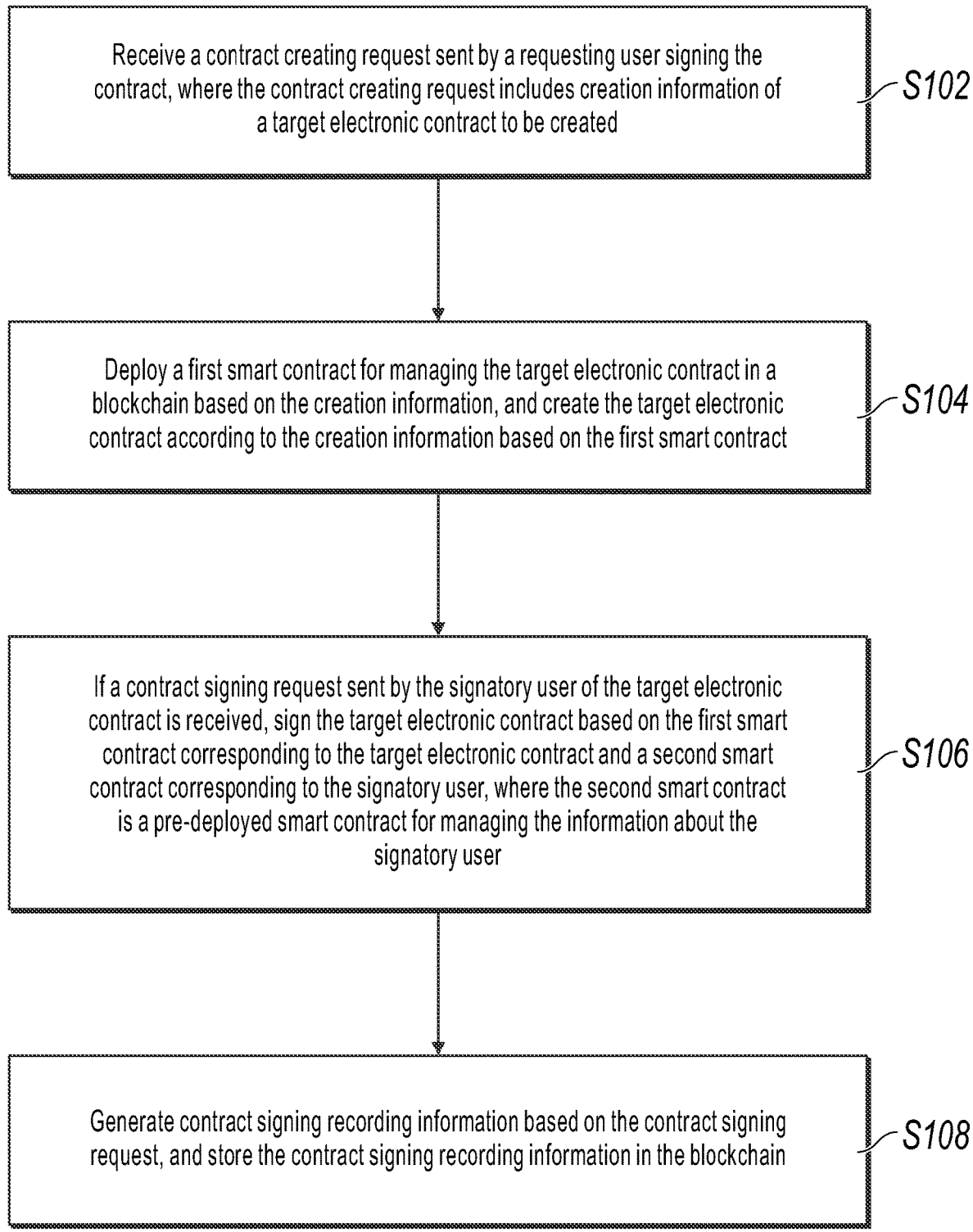
FIG. 11 is a ninth schematic flowchart illustrating a signing method of an electronic contract, according to one or more embodiments of the present specification.

Further, in order to ensure the traceability of the contract signing operation of the signatory user, in one or more embodiments of the present specification, as shown in FIG. 11, after the step S106, the method further includes the following:

Step S108. Contract signing recording information is generated based on the contract signing request, and is stored in the blockchain.

Specifically, the contract signing recording information is generated based on the user identification information and contract identification information, included in the contract signing request, of the signatory user, and determined signing time, which is stored in the blockchain.

The contract signing recording information is stored in the blockchain, so that the contract signing operation of the signatory user is traceable, and when a contract status identification request sent by the signatory user of the target electronic contract is received, status information of the target electronic contract can be returned based on the contract signing recording information in the blockchain. Specifically, after the step S108, the method can further include: the contract status identification request sent by the signatory user is received, and associated contract signing recording information is obtained from the blockchain based on the contract identification information, included in the contract status identification request, of the target electronic contract to be identified; and identification result information is sent to the signatory user based on the identified contract signing recording information, where a specific form of the identification result information can be specified in actual applications based on needs, for example, the identification result information can include the user identification information of the signatory user having signed the target electronic contract, etc.

In one or more embodiments of the present specification, the blockchain node, when receiving the contract creating request sent by the requesting user, deploys the first smart contract corresponding to the target electronic contract to be created in the blockchain, and creates the target electronic contract based on the deployed first smart contract; and signs the target electronic contract based on the first smart contract corresponding to the target electronic contract and the second smart contract corresponding to the signatory user when receiving the contract signing request sent by the signatory user of the target electronic contract. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Figure 12:
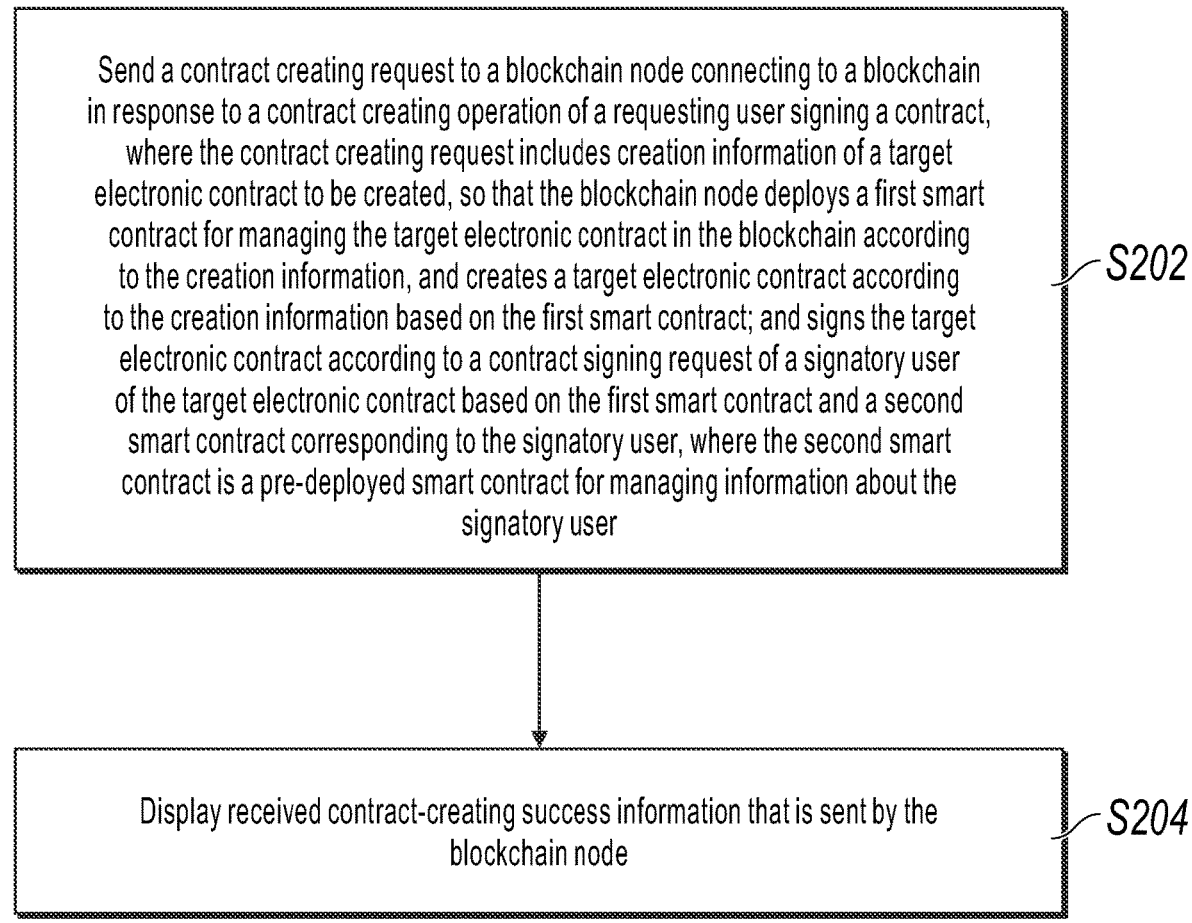
FIG. 12 is a seventh schematic flowchart illustrating a signing method of an electronic contract, according to one or more embodiments of the present specification.

Corresponding to the signing method of the electronic contract, described in FIG. 3 to FIG. 11, one or more embodiments of the present specification further provide another signing method of the electronic contract based on the same technical concept. FIG. 12 is a schematic flowchart illustrating another signing method of an electronic contract, according to one or more embodiments of the present specification. The method in FIG. 12 can be executed by the terminal device in FIG. 1. As shown in FIG. 12, the method includes the following steps:

Step S202. A contract creating request is sent to a blockchain node connecting to a blockchain in response to a contract creating operation of a requesting user signing a contract, where the contract creating request includes creation information of a target electronic contract to be created, so that the blockchain node deploys a first smart contract for managing the target electronic contract in the blockchain based on the creation information, and creates a target electronic contract according to the creation information based on the first smart contract; signs the target electronic contract according to a contract signing request of a signatory user of the target electronic contract based on the first smart contract and a second smart contract corresponding to the signatory user, where a second smart contract is a pre-deployed smart contract for managing information about the signatory user.

Step S204. The received contract-creation success information that is sent by the blockchain node is displayed.

Figure 13:
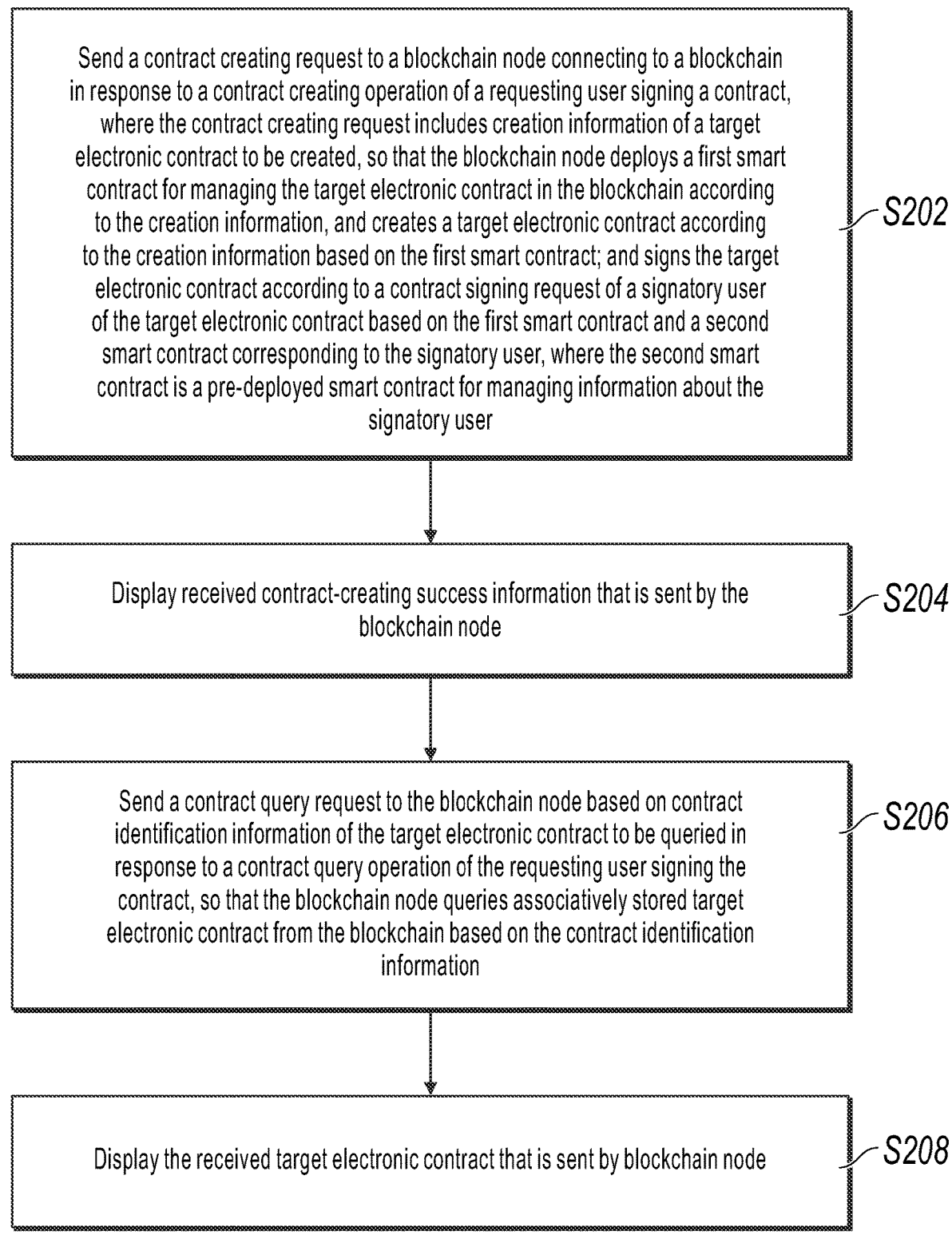
FIG. 13 is an eleventh schematic flowchart illustrating a signing method of an electronic contract, according to one or more embodiments of the present specification.

In order to ensure the accuracy of the target electronic contract, in one or more embodiments of the present specification, the contract-creation success information includes contract identification information of the target electronic contract; and the requesting user identifies the created target electronic contract based on the contract identification information to ensure the target electronic contract is accurate. Specifically, as shown in FIG. 13, after the step S204, the method further includes the following:

Step S206. A contract identification request is sent to the blockchain node based on contract identification information of the target electronic contract to be identified in response to the contract identification operation of the requesting user signing the contract, so that the blockchain node identifies associatively stored target electronic contract from the blockchain based on the contract identification information.

Step S208. The received target electronic contract that is sent by the blockchain node is displayed.

Figure 14:
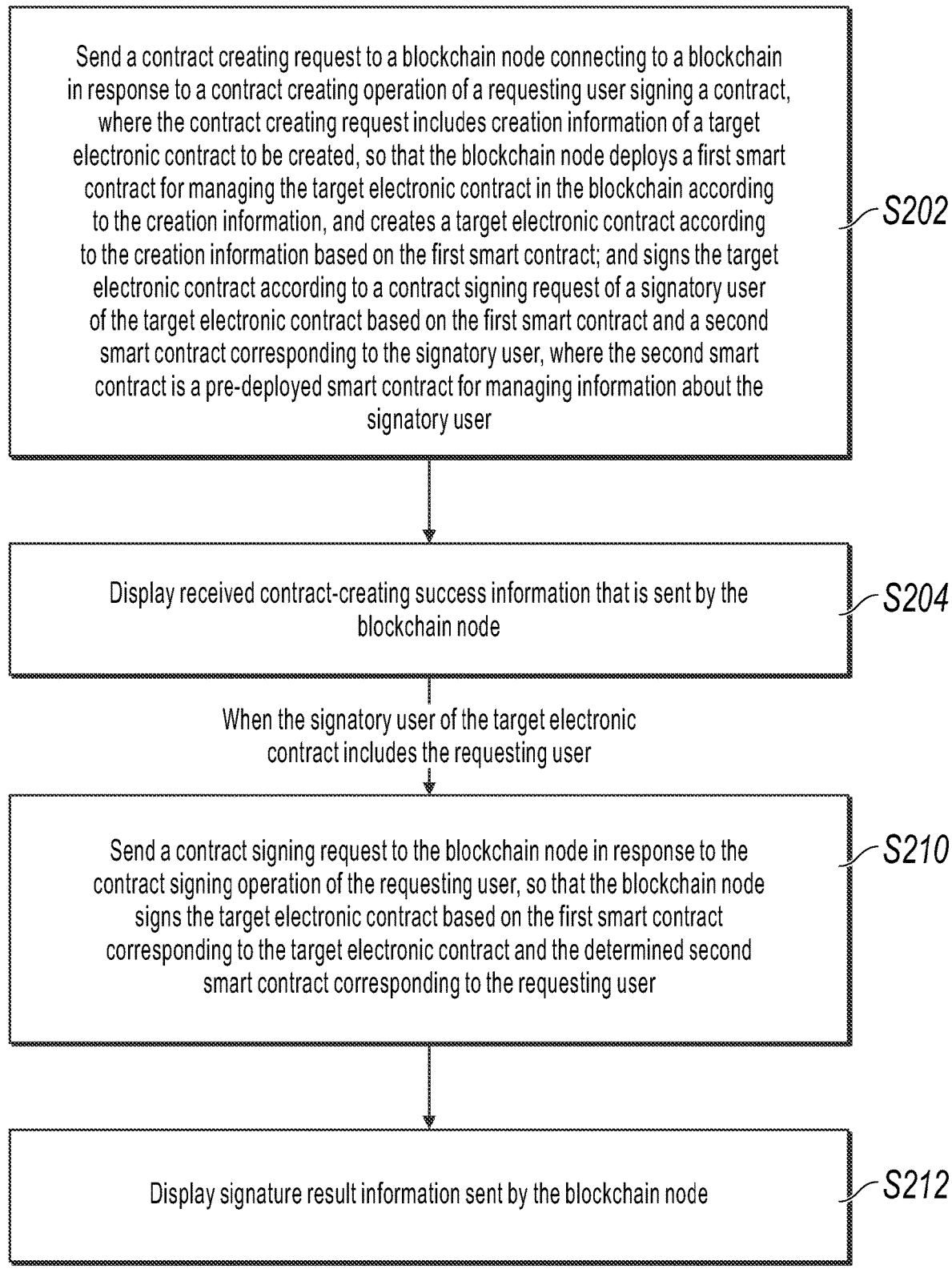
FIG. 14 is a twelfth schematic flowchart illustrating a signing method of an electronic contract, according to one or more embodiments of the present specification.

Further, in one or more embodiments of the present specification, when the signatory user of the target electronic contract includes the requesting user, as shown in FIG. 14, after the step S204, the method further includes the following:

Step S210. A contract signing request is sent to the blockchain node in response to the contract signing operation of the requesting user, so that the blockchain node signs the target electronic contract based on the first smart contract corresponding to the target electronic first smart contract and the determined second smart contract corresponding to the requesting user.

Step S212. The received signature result information sent by the blockchain node is displayed.

Specifically, in order to ensure that the requesting user has the right to sign the target electronic contract, the terminal device obtains identification information of the requesting user, contract identification information of the target electronic contract to be signed, and first signature data that specified data is signed based on a predetermined private key of the requesting user in response to the contract signing operation of the requesting user, and sends the previously described request of the contract based on the obtained identification information, the contract identification information and the signature data of the requesting user, so that the blockchain node signs the target electronic contract based on the corresponding first smart contract and the determined second smart contract corresponding to the requesting user when associated contract identification information is identified from the blockchain based on the contract identification information, it is determined that the first smart contract corresponding to the identified contract identification information includes the identification information of the requesting user, and the signature verification of the first signature data based on an obtained public key of the requesting user succeeds.

It is worthwhile to note that the process that other signatory users of the target electronic contract sign the target electronic contract is the same as the process that the requesting user signs the target electronic contract, and repeatability will not be described.

Since the private key of the requesting user is only held by the requesting user, the contract signing request is sent on a voluntary basis of the requesting user through the signature verification of the first signature data; the authenticity of the target electronic contract is ensured by verifying the contract identification information and the identification information, included in the contract signing request, of the requesting user; and the requesting user has the right to sign the target electronic contract, thereby ensuring the effective signature of the target electronic contract.

Further, when the requesting user is the signatory user, or has the right to identification the contract status, a current signature status of the target electronic contract can also be identified. Correspondingly, the method can further include: a contract status identification request is sent to the blockchain node in response to the contract status identification operation of the requesting user, so that the blockchain node identifies associated signing recording information from the blockchain based on the contract identification information, included in the contract status identification request, of the target electronic contract to be identified, and sends identification result information to the terminal device based on the identified signing recording information. The terminal device displays the received identification result information.

Further, no matter whether the requesting user is the signatory user for the target electronic contract to be created, the requesting user can operate its terminal device to send a registration request to the blockchain node, thereby completing signature when the requesting user is the signatory user of certain electronic contract. Correspondingly, the method can further include: the registration request is sent to the blockchain node in response to the registration of the requesting user, so that the blockchain node deploys the corresponding second smart contract based on the information, included in the registration request, of the requesting user, stores the determined identification information of the requesting user and contract address information of the deployed second smart contract to the blockchain associatively, and sends registration success information to the terminal device; and the received registration success information sent by the blockchain node is displayed. It is worthwhile to note that each signatory user of the target electronic contract registers in such method, and signs the target electronic contract after registration.

In one or more embodiments of the present specification, the blockchain node, the terminal device sends the contract creating request to the blockchain node connecting to the blockchain in response to the contract creation operation of the requesting user, so that the blockchain node deploys the first smart contract for managing the target electronic contract in the blockchain based on the creation information of the target electronic contract to be created, and creates the target electronic contract based on the first smart contract; and signs the target electronic contract based on the first smart contract corresponding to the target electronic contract and the second smart contract corresponding to the signatory user based on the contract signing request of the signatory user of the target electronic contract. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Figure 15:
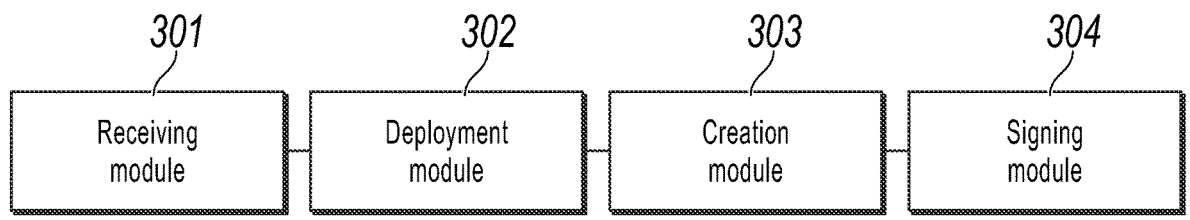
FIG. 15 is a schematic diagram illustrating composition of a first module of a signing apparatus of an electronic contract, according to one or more embodiments of the present specification.

Corresponding to the signing method of the electronic contract, described in FIG. 3 to FIG. 11, one or more embodiments of the present specification further provide a signing apparatus of the electronic contract based on the same technical concepts. FIG. 15 is a schematic diagram illustrating composition of modules of a signing apparatus of the electronic contract, according to one or more embodiments of the present specification. The apparatus is configured to execute the signing method of the electronic contract in FIG. 3 to FIG. 11. As shown in FIG. 8, the apparatus includes the following: a receiving module 301, configured to receive a contract creating request sent by a requesting user signing a contract, where the contract creating request includes creation information of a target electronic contract to be created; a deployment module 302, configured to deploy a first smart contract for managing the target electronic contract in a blockchain based on the creation information; a creation module 303, configured to create the target electronic contract according to the creation information based on the first smart contract; and a signing module 304, configured to sign the target electronic contract based on the first smart contract and a second smart contract corresponding to the signatory user if receiving a contract signing request sent by the signatory user of the target electronic contract, where the second smart contract is a pre-deployed smart contract for managing the related information about the signatory user.

When receiving the contract creating request sent by the requesting user signing the contract, the signing apparatus of the electronic contract provided in one or more embodiments of the present specification deploys the first smart contract corresponding to the target electronic contract to be created in the blockchain, and creates the target electronic contract based on the deployed first smart contract; and when receiving the contract signing request sent by the signatory user of the target electronic contract, the signing apparatus signs the target electronic contract based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Optionally, the contract signing request includes user identification information of the signatory user; the signing module 304 determines the second smart contract corresponding to the signatory user according to the user identification information of the signatory user based on the first smart contract; obtains signature information of the signatory user based on the determined second smart contract; and signs the target electronic contract based on the obtained signature information.

Optionally, the signing module 304 identifies the target electronic contract based on a predetermined signature position identification algorithm to obtain signature position information; and signing the target electronic contract based on the signature information and the signature position information.

Optionally, the creation module 303 obtains a contract template corresponding to the target electronic contract according to the creation information based on the first smart contract; determines a second smart contract corresponding to each signatory user of the target electronic contract; obtains identity information of each signatory user based on the determined second smart contract; and creates the target electronic contract based on the contract template and the identity information.

Optionally, the deployment module 302 obtains user identification information of each signatory user of the target electronic contract and contract address information of the second smart contract corresponding to each signatory user based on the creation information; deploys the first smart contract in the blockchain based on the user identification information of the signatory user, the contract address information, and a predetermined signature position identification algorithm; and correspondingly, the signing module 304 determines the second smart contract corresponding to the contract address information included in the first smart contract as a second smart contract corresponding to the signatory user.

Optionally, the deployment module 302 obtains contract address information of the second smart contract corresponding to each signatory user from the creation information; or obtains associated target contract address information from an association relationship between the user identification information and the contract address information, stored in the blockchain, of the signatory user based on the user identification information of the signatory user; and determines the obtained target contract address information as the contract address information of the second smart contract corresponding to the signatory user.

Optionally, the deployment module 302 obtains the user identification information of each signatory user from the creation information; deploys the first smart contract based on the obtained user identification information of the signatory user and the predetermined signature position identification algorithm; and correspondingly, the signing module 304 obtains associated target contract address information from the association relationship of the user identification information and the contract address information, stored in the blockchain, of the signatory based on the user identification information, included in the first smart contract, of the signatory user; and determines the second smart contract corresponding to the obtained target contract address information as a second smart contract corresponding to the signatory user.

Optionally, the creation module 303 obtains a contract template from the creation information, and determines the obtained contract template as a contract template corresponding to the target electronic contract; or obtains an associated target contract template from an association relationship of predetermined template identification information and the contract template based on template identification information in the creation information, and determines the obtained target contract template as the contract template corresponding to the target electronic contract.

Optionally, the apparatus further includes a registration module; the registration request receives a registration request sent by the signatory user, where the registration request includes information about the signatory user; deploys the corresponding second smart contract in the blockchain based on information of the signatory user; associatively stores the determined user identification information of the signatory user and the contract address information of the deployed second smart contract in the blockchain; and sends registration success information to the signatory user.

Optionally, the apparatus further includes a storage module; the storage module determines contract identification information of the target electronic contract, and stores the target electronic contract, the contract identification information, and the contract identification information of the first smart contract to the blockchain associatively; the signing module 304 obtains user identification information of the signatory user, contract identification information of the target electronic contract, and first signature data from the contract signing request, where the first signature data is signature data that specified data is signed based on a private key of the signatory user; if associated contract identification information is identified from the blockchain based on the obtained contract identification information, the first smart contract corresponding to the identified contract identification information includes the obtained user identification information of the signatory user, and the signature verification of the first signature data based on an obtained public key of the signatory user succeeds, the target electronic contract is signed based on the first smart contract corresponding to the identified contract identification information and the second smart contract corresponding to the signatory user, where the second smart contract is a pre-deployed smart contract for managing the related information about the signatory user.

Optionally, the apparatus further includes a sending module and a identification module; the sending module sends contract-creation success information to the requesting user, where the contract-creation success information includes the contract identification information of the target electronic contract; the receiving module 301 also receives a contract identification request sent by the requesting user, where the contract identification request includes contract identification information of a target electronic contract to be identified; the identification module obtains the associatively stored target electronic contract from the blockchain based on the contract identification information; and sends the obtained target electronic contract to the requesting user.

Optionally, the apparatus further includes a generation module; the generation module generates contract signing recording information based on the contract signing request after the signing module 304 signs the target electronic contract successfully based on the first smart contract; and stores the contract signing recording information to the blockchain.

When receiving the contract creating request sent by the requesting user signing the contract, the signing apparatus of the electronic contract provided in one or more embodiments of the present specification deploys the first smart contract corresponding to the target electronic contract to be created in the blockchain, and creates the target electronic contract based on the deployed first smart contract; and when receiving the contract signing request sent by the signatory user of the target electronic contract, the signing apparatus signs the target electronic contract based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

It is worthwhile to note that the embodiments of the signing apparatus of the electronic contract in the present specification and the embodiments of the signing method of the electronic contract in the present specification are based on the same inventive concept, and thus, the specific implementation of the embodiments can refer to the previously described implementation of the signing method of the electronic contract, and repeatability will not be described.

Figure 16:
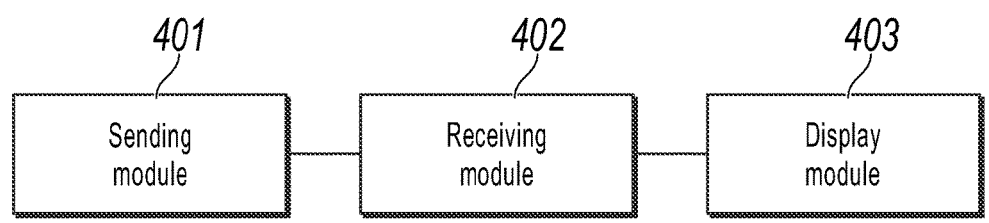
FIG. 16 is a schematic diagram illustrating composition of a second module of a signing apparatus of an electronic contract, according to one or more embodiments of the present specification.

Further, corresponding to the signing method of the electronic contract, as described in FIG. 12 to FIG. 14, one or more embodiments of the present specification further provide another signing apparatus of the electronic contract based on the same technical concept. FIG. 16 is a module composition schematic diagram illustrating another signing apparatus of the electronic contract, according to one or more embodiments of the present specification. The apparatus is configured to execute the signing method of the electronic contract in FIG. 12 to FIG. 14. As shown in FIG. 16, the apparatus includes the following: a sending module 401, configured to send a contract creating request to a blockchain node connecting to a blockchain in response to a contract creation operation of a requesting user signing a contract, where the contract creating request includes creation information of a target electronic contract to be created, so that the blockchain node deploys a first smart contract for managing the target electronic contract in the blockchain based on the creation information, and creates the target electronic contract according to the creation information based on the first smart contract; sign the target electronic contract according to a contract signing request of a signatory user of the target electronic contract based on the first smart contract and a second smart contract corresponding to the signatory user, where the second smart contract is a pre-deployed smart contract for managing the related information about the signatory user; and a receiving module 402, configured to receive contract-creation success information sent by the blockchain node; and a displaying module 403, configured to display the contract-creation success information.

Optionally, the signatory user of the target electronic contract includes the requesting user; and the sending module 401 sends a contract signing request to the blockchain node in response to the contract signing operation of the requesting user, so that the blockchain node signs the target electronic contract based on the first smart contract and the determined second smart contract corresponding to the requesting user.

Optionally, the contract-creation success information includes contract identification information of the target electronic contract; the sending module 401 sends a contract identification request to the blockchain node based on the contract identification information of the target electronic contract to be identified in response to the contract identification operation of the requesting user, so that the blockchain node identifies the associatively stored target electronic contract from the blockchain based on the contract identification information; and the displaying module 403 displays the received target electronic contract that is sent by the blockchain node.

The signing apparatus of the electronic contract provided in one or more embodiments of the present specification sends the contract creating request to the blockchain node connecting to the blockchain in response to the contract creation operation of the requesting user, so that the blockchain node deploys the first smart contract for managing the target electronic contract in the blockchain based on the creation information of the target electronic contract to be created, and creates the target electronic contract based on the first smart contract; and signs the target electronic contract based on the first smart contract corresponding to the target electronic contract and the second smart contract corresponding to the signatory user according to the contract signing request of the signatory user of the target electronic contract. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

It is worthwhile to note that the embodiments of the signing apparatus of the electronic contract in the present specification and the embodiments of the signing method of the electronic contract in the present specification are based on the same inventive concept, and thus, the specific implementation of the embodiments can refer to the previously described implementation of the signing method of the electronic contract, and repeatability will not be described.

Figure 17:
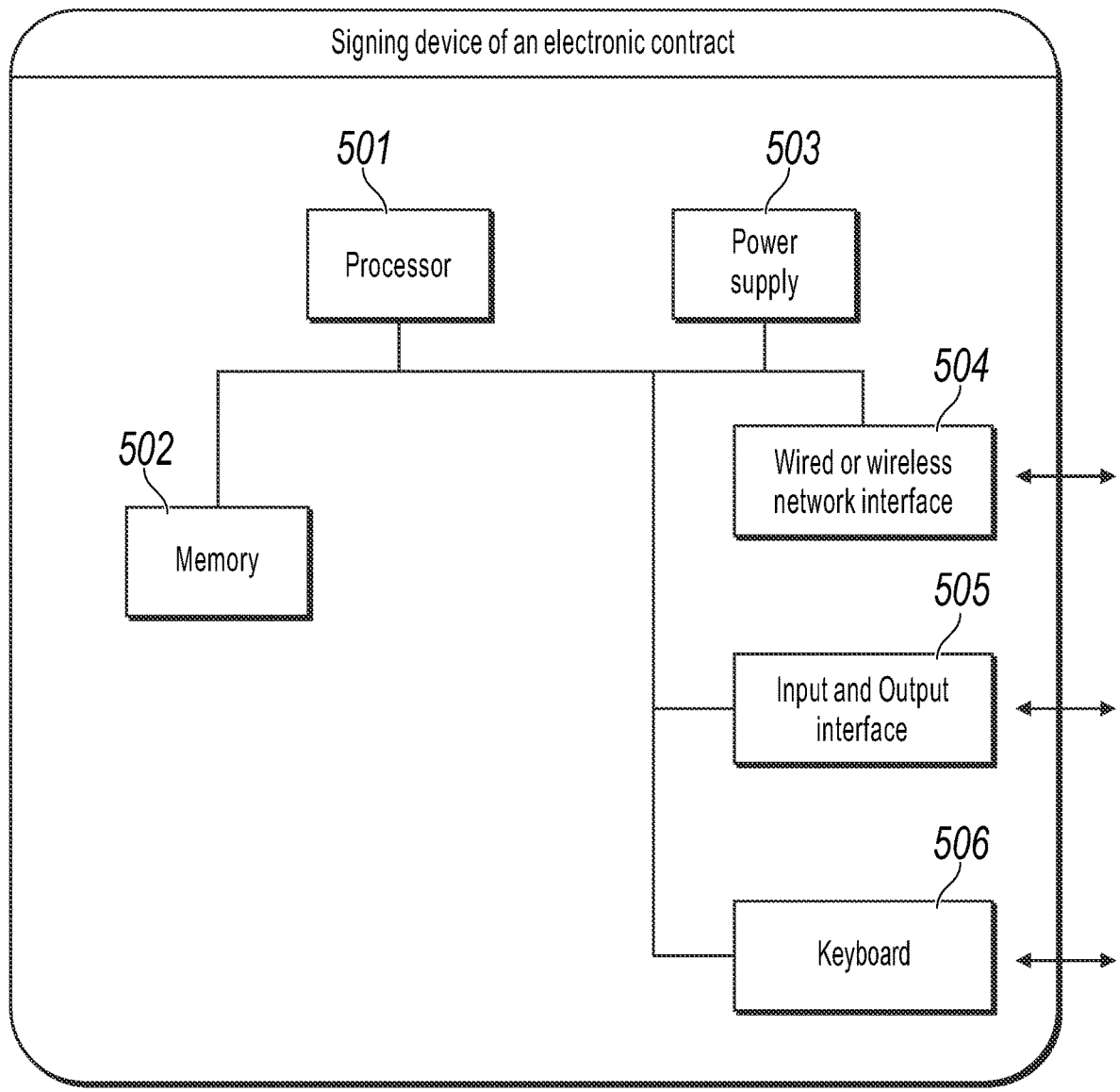
FIG. 17 is a schematic structural diagram illustrating a signing device of an electronic contract, according to one or more embodiments of the present specification.

Further, corresponding to the signing method of the electronic contract, one or more embodiments of the present specification further provide a signing device of the electronic contract based on the same technical concept, which is configured to execute the signing method of the electronic contract. FIG. 17 is a schematic structural diagram illustrating a signing device of an electronic contract, according to one or more embodiments of the present specification.

As shown in FIG. 17, the signing device of the electronic contract may have large difference due to different configurations or performance, which can include one or more than one processor 501 and memory 502, where the memory 502 can store one or more than one storage application program or data; and the memory 502 may store either temporarily or persistently. The application program stored in the memory 502 can include one or more than one module (not shown in the figure), where each module can include a series of computer executable instructions in the signing device of the electronic contract. Further, the processor 501 can be configured to communicate with the memory 502 to execute a series of computer executable instructions in the memory 502 on the signing device of the electronic contract. The signing device of the electronic contract can further include one or more than one power supply 503, one or more than one wired or wireless network interface 504, one or more than one input/output interface 505, and one or more than one keyboard 506, etc.

In some specific embodiments, the signing device of the electronic contract includes a memory and one or more than one program, where one or more than one program is stored in the memory and can include one or more than one module, and each module can include a series of computer executable instructions in the signing device of the electronic contract, and is configured to be executed by one or more than one processor; and one or more than one program contains the following computer executable instructions: receiving a contract creating request sent by a requesting user signing a contract, where the contract creating request includes creation information of a target electronic contract to be created; deploying a first smart contract for managing the target electronic contract in a blockchain based on the creation information, and creating the target electronic contract according to the creation information based on the first smart contract; and if receiving a contract signing request sent by a signatory user of the target electronic contract, signing the target electronic contract based on the first smart contract and a second smart contract corresponding to the signatory user, where the second smart contract is a predeployed smart contract for managing the related information about the signatory user.

When receiving the contract creating request sent by the requesting user, the signing device of the electronic contract provided in one or more embodiments of the present specification deploys the first smart contract corresponding to the target electronic contract to be created in the blockchain, and creates the target electronic contract based on the deployed first smart contract; and when receiving the contract signing request sent by the signatory user of the target electronic contract, the signing device signs the target electronic contract based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Optionally, when the computer executable instruction is executed, the contract signing request includes user identification information of the signatory user; the step that the target electronic contract is signed based on the first smart contract and the second smart contract corresponding to the signatory user includes the following: the second smart contract corresponding to the signatory user is determined according to the user identification information of the signatory user based on the first smart contract; signature information of the signatory user is obtained based on the determined second smart contract; and the target electronic contract is signed based on the obtained signature information.

Optionally, the step that when the computer executable instruction is executed, the target electronic contract is signed based on the obtained signature information includes the following: the target electronic contract is identified based on a predetermined signature position identification algorithm to obtain signature position information; and the target electronic contract is signed based on the signature information and the signature position information.

Optionally, the step that when the computer executable instruction is executed, the target electronic contract is created according to the creation information based on the first smart contract includes the following: a contract template corresponding to the target electronic contract is obtained according to the creation information based on the first smart contract; a second smart contract corresponding to each signatory user of the target electronic contract is determined; identity information of each signatory user is obtained based on the determined second smart contract; and the target electronic contract is created based on the contract template and the identity information.

Optionally, the step that when the computer executable instruction is executed, the first smart contract for managing the target electronic contract is deployed in the blockchain based on the creation information includes the following:

User identification information of each signatory user of the target electronic contract and contract address information of the second smart contract corresponding to each signatory user are obtained based on the creation information; the first smart contract is deployed in the blockchain based on the user identification information of the signatory user, the contract address information, and a predetermined signature position identification algorithm; and the step that a second smart contract corresponding to each signatory user of the target electronic contract is determined includes the following: the second smart contract corresponding to the contract address information included in the first smart contract is determined as the second smart contract corresponding to the signatory user.

Optionally, the step that when the computer executable instruction is executed, the contract address information of the second smart contract corresponding to each signatory user is obtained based on the creation information includes the following: the contract address information of the second smart contract corresponding to each signatory user is obtained from the creation information; or associated target contract address information from an association relationship between the user identification information and the contract address information of the signatory user, stored in the blockchain, are obtained based on the user identification information of the signatory user; and the obtained target contract address information is determined as the contract address information of the second smart contract corresponding to the signatory user.

Optionally, the step that when computer executable instruction is executed, the first smart contract for managing the target electronic contract is deployed in the blockchain based on the creation information includes the following: the user identification information of each signatory user is obtained from the creation information; the first smart contract is deployed based on the obtained user identification information of the signatory user and the predetermined signature position identification algorithm; and the step that a second smart contract corresponding to each signatory user of the target electronic contract is determined includes the following: the associated target contract address information is obtained from the association relationship of the user identification information and the contract address information, stored in the blockchain, of the signatory user based on the user identification information, included in the first smart contract, of the signatory user; and the second smart contract corresponding to the obtained target contract address information is determined as the second smart contract corresponding to the signatory user.

Optionally, the step that when the computer executable instruction is executed, the contract template corresponding to the target electronic contract is obtained based on the creation information includes the following: the contract template is obtained from the creation information, and the obtained contract template is determined as the contract template corresponding to the target electronic contract; or an associated target contract template is obtained from an association relationship of predetermined template identification information and the contract template based on template identification information in the creation information, and the obtained target contract template is determined as the contract template corresponding to the target electronic contract.

Optionally, before the step that when the computer executable instruction is executed, and a contract creating request sent by a requesting user signing a contract is received, the method further includes the following: a registration request sent by the signatory user is received, where the registration request includes information about the signatory user; the corresponding second smart contract is deployed in the blockchain based on information of the signatory user; the determined user identification information of the signatory user and the contract address information of the deployed second smart contract are associatively stored in the blockchain; and registration success information is sent to the signatory user.

Optionally, after the step that when the computer executable instruction is executed, the target electronic contract is created based on the first smart contract, the method further includes the following: contract identification information of the target electronic contract is determined, and the target electronic contract, the contract identification information, and the contract identification information of the first smart contract are associatively stored in the blockchain; the step that the target electronic contract is signed based on the first smart contract and the second smart contract corresponding to the signatory user includes the following: user identification information of the signatory user, contract identification information of the target electronic contract and first signature data are obtained from the contract signing request, where the first signature data is signature data obtained by signing specified data based on a private key of the signatory user; and if associated contract identification information is identified from the blockchain based on the obtained contract identification information, the first smart contract corresponding to the identified contract identification information includes the obtained user identification information of the signatory user, and the signature verification of the first signature data based on an obtained public key of the signatory user succeeds, the target electronic contract is signed based on the first smart contract and the second smart contract corresponding to the signatory user.

Optionally, after the step that when the computer executable instruction is executed, the target electronic contract is created according to the creation information based on the first smart contract, the method further includes the following: contract-creation success information is sent to the requesting user, where the contract-creation success information includes the contract identification information of the target electronic contract; a contract identification request sent by the requesting user is received, where the contract identification request includes contract identification information of the target electronic contract to be identified; associatively stored target electronic contract is obtained from the blockchain based on the contract identification information; and the obtained target electronic contract is sent to the requesting user.

Optionally, after the step that when the computer executable instruction is executed, the target electronic contract is signed based on the first smart contract and a second smart contract corresponding to the signatory user, the method further includes the following: contract signing recording information is generated based on the contract signing request; and the contract signing recording information is stored in the blockchain.

When receiving the contract creating request sent by the requesting user, the signing device of the electronic contract provided in one or more embodiments of the present specification deploys the first smart contract corresponding to the target electronic contract to be created in the blockchain, and creates the target electronic contract based on the deployed first smart contract; and when receiving the contract signing request sent by the signatory user of the target electronic contract, the signing device signs the target electronic contract based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

In other specific embodiments, the signing device of the electronic contract includes a memory and one or more than one program, where one or more than one program is stored in the memory and can include one or more than one module, and each module can include a series of computer executable instructions in the signing device of the electronic contract, and is configured to be executed by one or more than one processor; and one or more than one program contains the following computer executable instructions: sending a contract creating request to a blockchain node connecting to a blockchain in response to the contract creation operation of a requesting user signing a contract, where the contract creating request includes creation information of a target electronic contract to be created, so that the blockchain node deploys a first smart contract for managing the target electronic contract in the blockchain based on the creation information, and creates the target electronic contract according to the creation information based on the first smart contract; signing the target electronic contract according to a contract signing request of a signatory user of the target electronic contract based on the first smart contract and a second smart contract corresponding to the signatory user, where the second smart contract is a pre-deployed smart contract for managing the related information about the signatory user; and displaying received contract-creation success information that is sent by the blockchain node.

Optionally, when the computer executable instruction is executed, the signatory user of the target electronic contract includes the requesting user; after the step that received contract-creation success information that is sent by the blockchain node is displayed, the method further includes the following: a contract signing request is sent to the blockchain node in response to the contract signing operation of the requesting user, so that the blockchain node signs the target electronic contract based on the first smart contract and the determined second smart contract corresponding to the requesting user.

Optionally, when the computer executable instruction is executed, the contract-creation success information includes contract identification information of the target electronic contract; after the step that the received contract-creation success information that is sent by the blockchain node is displayed, the method further includes the following: a contract identification request is sent to the blockchain node based on contract identification information of the target electronic contract to be identified in response to the contract identification operation of the requesting user, so that the blockchain node identifies associatively stored target electronic contract from the blockchain based on the contract identification information; and the received target electronic contract that is sent by the blockchain node is displayed.

The signing device of the electronic contract provided in one or more embodiments of the present specification sends the contract creating request to the blockchain node connecting to the blockchain in response to the contract creation operation of the requesting user, so that the blockchain node deploys the first smart contract for managing the target electronic contract in the blockchain based on the creation information of the target electronic contract to be created, and creates the target electronic contract based on the first smart contract; and signs the target electronic contract based on the first smart contract corresponding to the target electronic contract and the second smart contract corresponding to the signatory user according to the contract signing request of the signatory user of the target electronic contract. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

It is worthwhile to note that the embodiments of the signing device of the electronic contract in the present specification and the embodiments of the signing method of the electronic contract in the present specification are based on the same inventive concept, and thus, the specific implementation of the embodiments can refer to the previously described implementation of the signing method of the electronic contract, and repeatability will not be described.

Further, corresponding to the previously described method, one or more embodiments of the present specification further provide a storage medium for storing a computer executable instruction based on the same technical concept. In some specific embodiments, the storage medium may be a USB flash disk, an optical disk, a hard disk, etc.; and when the computer executable instruction stored by the storage medium is executed by a processor, the following processes can be implemented: a contract creating request sent by a requesting user signing a contract is received, where the contract creating request includes creation information of a target electronic contract to be created; a first smart contract for managing the target electronic contract is deployed in a blockchain based on the creation information, and the target electronic contract is created according to the creation information based on the first smart contract; and if a contract signing request sent by a signatory user of the target electronic contract is received, the first smart contract is called, and the target electronic contract is signed based on the first smart contract based on the first signatory.

When the computer executable instruction stored by the storage medium provided in one or more embodiments of the present specification is executed by a processor, and when the contract creating request sent by the requesting user is received, the first smart contract corresponding to the target electronic contract to be created is deployed in the blockchain, and the target electronic contract is created based on the deployed first smart contract; and when the contract signing request sent by the signatory user of the target electronic contract is received, the target electronic contract is signed based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

Optionally, when the computer executable instruction stored by the storage medium is executed, the contract signing request includes user identification information of the signatory user; the step that the target electronic contract is signed based on the first smart contract and the second smart contract corresponding to the signatory user includes the following: the second smart contract corresponding to the signatory user is determined according to the user identification information of the signatory user based on the first smart contract; signature information of the signatory user is determined based on the determined second smart contract; and the target electronic contract is signed based on the obtained signature information.

Optionally, when the computer executable instruction stored by the storage medium is executed, the signing the target electronic contract based on the obtained signature information includes the following: the target electronic contract is identified based on a predetermined signature position identification algorithm to obtain signature position information; and the target electronic contract is signed based on the signature information and the signature position information.

Optionally, the step that when the computer executable instruction stored by the storage medium is executed, the target electronic contract is created according to the creation information based on the first smart contract includes the following: a contract template corresponding to the target electronic contract is obtained according to the creation information based on the first smart contract; a second smart contract corresponding to each signatory user of the target electronic contract is determined; identity information of each signatory user is obtained based on the determined second smart contract; and the target electronic contract is created based on the contract template and the identity information.

Optionally, the step that when the computer executable instruction stored by the storage medium is executed by a processor, the first smart contract for managing the target electronic contract is deployed in the blockchain based on the creation information includes the following: user identification information of each signatory user of the target electronic contract and contract address information of the second smart contract corresponding to each signatory user are obtained based on the creation information; the first smart contract is deployed in the blockchain based on the user identification information of the signatory user, the contract address information, and a predetermined signature position identification algorithm; and the step that a second smart contract corresponding to each signatory user of the target electronic contract is determined includes the following: the second smart contract corresponding to the contract address information included in the first smart contract is determined as the second smart contract corresponding to the signatory user.

Optionally, the step that when the computer executable instruction stored by the storage medium is executed, the contract address information of the second smart contract corresponding to each signatory user is obtained based on the creation information includes the following: the contract address information of the second smart contract corresponding to each signatory user is obtained from the creation information; or associated target contract address information is obtained from an association relationship between the user identification information and the contract address information, stored in the blockchain, of the signatory user based on the user identification information of the signatory user; and the obtained target contract address information is determined as the contract address information of the second smart contract corresponding to the signatory user.

Optionally, the step that when the computer executable instruction stored by the storage medium is executed by a processor, the first smart contract for managing the target electronic contract is deployed in the blockchain based on the creation information includes the following: the user identification information of each signatory user is obtained from the creation information; the first smart contract is deployed based on the obtained user identification information of the signatory user and the predetermined signature position identification algorithm; and the step that the second smart contract corresponding to each signatory user of the target electronic contract is determined includes the following: the associated target contract address information is obtained from the association relationship of the user identification information and the contract address information, stored in the blockchain, of the signatory user based on the user identification information, included in the first smart contract, of the signatory user; and the second smart contract corresponding to the obtained target contract address information is determined as the second smart contract corresponding to the signatory user.

Optionally, the step that when the computer executable instruction stored by the storage medium is executed by a processor, the contract template corresponding to the target electronic contract is obtained based on the creation information includes the following: the contract template is obtained from the creation information, and the obtained contract template is determined as the contract template corresponding to the target electronic contract; or an associated target contract template is obtained from an association relationship of predetermined template identification information and the contract template based on template identification information in the creation information, and the obtained target contract template is determined as the contract template corresponding to the target electronic contract.

Optionally, before the step that when the computer executable instruction stored by the storage medium is executed by a processor, a contract creating request sent by a requesting user signing a contract is received, the method further includes the following: a registration request sent by the signatory user is received, where the registration request includes information about the signatory user; the corresponding second smart contract is deployed in the blockchain based on information of the signatory user; the determined user identification information of the signatory user and the contract address information of the deployed second smart contract are associatively stored in the blockchain; and registration success information is sent to the signatory user.

Optionally, after the step that when the computer executable instruction stored by the storage medium is executed by a processor, the target electronic contract is created based on the first smart contract, the method further includes the following: contract identification information of the target electronic contract is determined, and the target electronic contract, the contract identification information, and the contract identification information of the first smart contract are associatively stored in the blockchain; the step that the target electronic contract is signed based on the first smart contract and the second smart contract corresponding to the signatory user includes the following: user identification information of the signatory user, contract identification information of the target electronic contract and first signature data are obtained from the contract signing request, where the first signature data is signature data obtained by signing specified data based on a private key of the signatory user; and if associated contract identification information is identified from the blockchain based on the obtained contract identification information, the first smart contract corresponding to the identified contract identification information includes the obtained user identification information of the signatory user, and the signature verification of the first signature data based on an obtained public key of the signatory user succeeds, the target electronic contract is signed based on the first smart contract and the second smart contract corresponding to the signatory user.

Optionally, after the step that when the computer executable instruction stored by the storage medium is executed by a processor, the target electronic contract is created according to the creation information based on the first smart contract, the method further includes the following: contract-creation success information is sent to the requesting user, where the contract-creation success information includes the contract identification information of the target electronic contract; a contract identification request sent by the requesting user is received, where the contract identification request includes contract identification information of the target electronic contract to be identified; associatively stored target electronic contract is obtained from the blockchain based on the contract identification information; and the obtained target electronic contract is sent to the requesting user.

Optionally, after the step that when the computer executable instruction stored by the storage medium is executed by a processor, the target electronic contract is signed based on the first smart contract and a second smart contract corresponding to the signatory user, the method further includes the following: contract signing recording information is generated based on the contract signing request; and the contract signing recording information is stored in the blockchain.

When the computer executable instruction stored by the storage medium provided in one or more embodiments of the present specification is executed by a processor, and when the contract creating request sent by the requesting user is received, the first smart contract corresponding to the target electronic contract to be created is deployed in the blockchain, and the target electronic contract is created based on the deployed first smart contract; and when the contract signing request sent by the signatory user of the target electronic contract is received, the target electronic contract is signed based on the first smart contract corresponding to the target electronic contract and the second smart contract corresponding to the signatory user. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

In some specific embodiments, the storage medium may be a USB flash disk, an optical disk, a hard disk, etc.; and when the computer executable instruction stored by the storage medium is executed by a processor, the following processes can be implemented: a contract creating request is sent to a blockchain node connecting to a blockchain in response to the contract creation operation of a requesting user signing a contract, where the contract creating request includes creation information of a target electronic contract to be created, so that the blockchain node deploys a first smart contract for managing the target electronic contract in the blockchain based on the creation information, and creates the target electronic contract according to the creation information based on the first smart contract; the target electronic contract is signed according to a contract signing request of a signatory user of the target electronic contract based on the first smart contract and a second smart contract corresponding to the signatory user, where the second smart contract is a pre-deployed smart contract for managing the related information about the signatory user; and received contract-creation success information that is sent by the blockchain node is displayed.

Optionally, when the computer executable instruction stored by the storage medium is executed by the processor, the signatory user of the target electronic contract includes the requesting user; after the step that the received contract-creation success information that is sent by the blockchain node is displayed, the method further includes the following: a contract signing request is sent to the blockchain node in response to the contract signing operation of the requesting user, so that the blockchain node signs the target electronic contract based on the first smart contract and the determined second smart contract corresponding to the requesting user.

Optionally, when the computer executable instruction by the storage medium is executed by a processor, the contract-creation success information includes contract identification information of the target electronic contract; after the step that the received contract-creation success information that is sent by the blockchain node is displayed, the method further includes the following: a contract identification request is sent to the blockchain node based on contract identification information of the target electronic contract to be identified in response to the contract identification operation of the requesting user, so that the blockchain node identifies associatively stored target electronic contract from the blockchain based on the contract identification information; and the received target electronic contract that is sent by the blockchain node is displayed.

When the computer executable instruction stored by the storage medium provided in one or more embodiments of the present specification is executed by a processor, the contract creating request is sent to the blockchain node connecting to the blockchain in response to the contract creation operation of the requesting user, so that the blockchain node deploys the first smart contract for managing the target electronic contract in the blockchain based on the creation information of the target electronic contract to be created, and creates the target electronic contract based on the first smart contract; and the target electronic contract is signed based on the first smart contract corresponding to the target electronic contract and the second smart contract corresponding to the signatory user according to the contract signing request of the signatory user of the target electronic contract. Therefore, the user conducts data interaction directly with the blockchain node in the blockchain, and creates and signs the electronic contract in the blockchain to not only achieve the value of the blockchain sufficiently, but also simplify the participant of the electronic contract on the basis of ensuring the validity of the electronic contract, thereby solving the trust problem between the user and the third-party electronic contract platform. In addition, creating and signing the electronic contract based on the smart contract, without human involvement, improves the creation efficiency and signature efficiency of the electronic contract.

It is worthwhile to note that the embodiments of the storage medium in the present specification and the embodiments of the signing method of the electronic contract in the present specification are based on the same inventive concept, and thus, the specific implementation of the embodiments can refer to the previously described implementation of the signing method of the electronic contract, and repeatability will not be described.

The foregoing describes the specific embodiments of the present specification. Other embodiments fall within the scope of the appended claims. In some cases, the actions or steps described in the claims can be performed in a different order than in the embodiments and still achieve desired results. In addition, the process described in the drawings does not necessarily require a particular order or sequential order to be shown to achieve the desired results. In some implementations, multitask processing and parallel processing may either achieve the expected effect or be favorable.

In the 1990s, it was obvious that improvements to the technology could be distinguished between hardware improvements (e.g., improvements in diodes, transistors, switches, and other circuit structures) and software improvements (improvements to methods and procedures). However, with the development of technology, improvements in a variety of the current methods and procedures can be deemed as direct improvements in a hardware circuit structure. A designer almost always obtains the corresponding hardware circuit structure by programming the improved methods and procedures into a hardware circuit. Therefore, it cannot indicate that improvements in the methods and procedures cannot be implemented with a hardware entity module. For example, a Programmable Logic Device (PLD) (e.g., Field Programmable Gate Array (FPGA)) is an integrated circuit whose logic function is determined by user's programming to the device. A digital system is programmed by the designer to be "integrated" on a PLD, without the need for a chip manufacturer to design and produce a dedicated integrated circuit chip. Moreover, nowadays, the manual making of the integrated circuit chip is replaced, and such programming is mostly implemented with "logic compiler" software, which is similar to a software compiler used in program development and writing; and the original code before compiling has to be written in a specific programming language, which is called hardware description language (HDL). However, there are a variety of HDLs instead of one kind, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). Currently, the most commonly used ones are VHDL (Very-High-Speed Integrated Circuit Hardware Description Language) and Verilog. It should also be clear to a person skilled in the art that the hardware circuit implementing the logical methods and procedures can be easily obtained only by conducting logic programming on the methods and procedures in several previously described hardware description languages and programming them to the integrated circuit.

A controller may be implemented in any suitable manner, for example, the controller can be implemented by using a microprocessor or a processor and a computer-readable medium storing computer-readable program code (e.g., software or firmware) executable by the (micro) processor, a logic gate, a switch, an application specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicon Labs C8051F320; and a memory controller can also be implemented as can be implemented as one part of the control logic of a memory. It is also known to those skilled in the art that, in addition to implementing the controller in a pure computer-readable program code, it is entirely possible to make the controller attain the same function in the forms of the logic gate, the switch, ASIC, the programmable logic controller, and the embedded microcontroller by logically programming method steps. Therefore, such controller can be considered as a hardware component, and an apparatus for attaining various functions, included therein, can also be considered as a structure within the hardware component. Or even, the apparatus configured to attain various functions can be considered as either a software module implementing the method or a structure in the hardware component.

The system, apparatus, module, or unit illustrated in the previous embodiments can be implemented by using a computer chip or an entity, or can be implemented by using a product having certain function. A typical implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the previously described apparatus is described separately by dividing functions into various units. During implementation of the embodiments of the present application, the function of each unit can be implemented in at least one or more pieces of software or at least one or more pieces of hardware.

Those skilled in the art shall understand that one or more embodiments of the present specification can provide a method, a system, or a computer program product. Therefore, one or more embodiments of the present specification can be implemented through complete hardware embodiments, complete software embodiments, or embodiments combining software or hardware. Moreover, the present specification can be implemented through the computer program product implemented on one or more storage media available to a computer (including, but not limited to a disk storage, a compact disc read-only memory (CD-ROM), an optical memory) containing a program code available to the computer.

The present specification is described by referring to a method, an apparatus (a system) and at least one of a flowchart or a block diagram of the computer program product in the present specification. It should be understood that at least one of each flow or block in at least one of the flowchart or the block diagram, and a combination of at least one of a flow or a block in at least one of the flowchart or the block diagram can be implemented by computer program instructions. The computer program instructions can be provided to an all-purpose computer, a special-purpose computer, an embedded processor or a processor for other programmable data processing devices to produce a machine, so that an apparatus for attaining a function as specified in at least one of one or more flows of the flowchart or one or more blocks of the block diagram is generated with the instructions which are executed by the computer or the processor for other programmable data processing devices.

The computer program instructions can also be stored in a computer readable memory that guides the computer or other programmable data processing devices to operate in the specific way, so that the instructions stored in the computer readable memory generates a manufactured material including an instruction apparatus, which can attain the function as specified in the at least one of one or more flows of the flowchart or one or more blocks of the block diagram.

The computer program instructions can also be loaded to the computer or other programmable data processing devices, so that a series of operations are executed on the computer or other programmable devices to make the computer available in processing, thereby providing a step for attaining the function as specified in at least one of one or more flows of the flowchart or one or more blocks of the block diagram with the instructions which are executed by the computer or other programmable devices.

In a typical configuration, a computing device includes one or more processors (CPU), an input/output interface, a network interface and a memory.

The memory may include at least one of a volatile memory, a random access memory (RAM) or a non-volatile memory in a computer readable medium, e.g., a read only memory (ROM) or a flash memory (flash RAM). The memory is an example of the computer readable medium.

The computer readable medium includes non-volatile and volatile, removable, or non-removable media, which can realize information storage in any method or technology. Information can be a computer readable instruction, a data structure, a program module, or other data. Examples of the storage medium of the computer include, but are not limited to a phase change memory (PRAM), a static random access memory (SRAM), a dynamic random access memory (DRAM), other types of RAMs, ROM, an electrically-erasable programmable read-only memory, a flash memory or other memory technologies, CD-ROM, a digital versatile disc (DVD) or another optical storage, a cassette, a cassette magnetic disk storage, or other magnetic storage devices or any other non-transmission media, which can be configured to store information that can be accessed by the computing device. As described in the present application, the computer readable medium does not include computer readable transitory media, such as a modulated data signal and a carrier.

It is worthwhile to note that terms "include", "contain" or any other variants of them are meant to cover non-exclusive inclusions, so that a process, method, product or device that includes a series of elements not only includes those elements, but also includes other elements which are not definitely listed, or further includes inherent elements of this process, method, product or device. Elements described by a sentence "includes a/an" do not exclude that the processes, methods, products or devices that include the elements still include other identical elements without more restrictions.

One or more embodiments of the present specification may be described in the general context of a computer executable instruction executed by a computer, e.g., a program module. Generally, the program module includes a routine, a program, an object, an assembly, a data structure, etc. to execute a specific task or implement a specific abstract data type. One or more embodiments of the present specification can also be practiced in distributed computing environment, where a remote communication device that is connected through a communication network executes a task. In the distributed computing environment, the program module can be located in local and remote computer storage media, including a storage device.

The various embodiments in the present specification are described in a progressive manner, and the same or similar parts between the various embodiments can refer to each other, and each embodiment focuses on the differences from other embodiments. In particular, as for the system embodiments, since they are basically similar to the method embodiments, the description is relatively simple, and related parts refer to part of the descriptions of the method embodiments.

The previous descriptions are merely the embodiments of the present application, but not intended to limit the present application. Those skilled in the art can make various changes and variations to the present specification. Any modifications, equivalent replacements, improvements, etc. that are made without departing from the spirit and the principle of the present specification shall all fall within the scope of the claims of the present specification.

What is claimed is:

1. A computer-implemented method, comprising:
deploying, by a blockchain node of a blockchain network, a second smart contract corresponding to a signatory user of a target electronic contract for managing information associated with the signatory user;
receiving, by the blockchain node of the blockchain network, a contract creating request from a requesting user, wherein the contract creating request comprises creation information of the target electronic contract to be created;
deploying, by the blockchain node, a first smart contract for managing the target electronic contract in a blockchain based on the creation information;
creating, by the blockchain node, the target electronic contract according to the creation information and based on the first smart contract; and
in response to receiving a contract signing request from the signatory user of the target electronic contract, wherein the contract signing request comprises user identification information of the signatory user:
invoking, by the blockchain node, the first smart contract;
determining, by the blockchain node and based on the first smart contract, the second smart contract corresponding to the signatory user according to the user identification information of the signatory user;
obtaining, by the blockchain node, signature information of the signatory user based on the second smart contract; and
signing, by the blockchain node, the target electronic contract based on the signature information.

2. The computer-implemented method of claim 1, wherein the signing the target electronic contract based on the signature information comprises:
identifying the target electronic contract based on a predetermined signature position identification algorithm to obtain signature position information; and
signing the target electronic contract based on the signature information and the signature position information.

3. The computer-implemented method of claim 1, wherein the creating the target electronic contract according to the creation information and based on the first smart contract comprises:
obtaining a contract template corresponding to the target electronic contract according to the creation information based on the first smart contract;
determining a respective second smart contract corresponding to each signatory user of the target electronic contract;
obtaining respective identity information of each signatory user based on the respective second smart contract; and
creating the target electronic contract based on the contract template and the respective identity information.

4. The computer-implemented method of claim 3, wherein the deploying a first smart contract for managing the target electronic contract in a blockchain based on the creation information comprises:
obtaining respective user identification information of each signatory user of the target electronic contract and respective contract address information of the respective second smart contract corresponding to each signatory user based on the creation information; and
deploying the first smart contract in the blockchain based on the respective user identification information of each signatory user, the respective contract address information, and a predetermined signature position identification algorithm; and wherein
the determining a respective second smart contract corresponding to each signatory user of the target electronic contract comprises:
determining a respective second smart contract corresponding to the respective contract address information comprised in the first smart contract as the respective second smart contract corresponding to each signatory user.

5. The computer-implemented method of claim 4, wherein the obtaining respective contract address information of the respective second smart contract corresponding to each signatory user based on the creation information comprises:
obtaining the respective contract address information of the respective second smart contract corresponding to each signatory user from the creation information; or
obtaining associated target contract address information from an association relationship between user identification information and contract address information of each signatory user, based on the respective user identification information of each signatory user, wherein the association relationship is stored in the blockchain; and
determining the associated target contract address information as the respective contract address information of the respective second smart contract corresponding to each signatory user.

6. The computer-implemented method of claim 3, wherein the deploying a first smart contract for managing the target electronic contract in a blockchain based on the creation information comprises:
obtaining respective user identification information of each signatory user from the creation information; and
deploying the first smart contract based on the respective user identification information of each signatory user and a predetermined signature position identification algorithm; and wherein
the determining a respective second smart contract corresponding to each signatory user of the target electronic contract comprises:
obtaining associated target contract address information from an association relationship between user identification information and contract address information of each signatory user, based on the user identification information of the signatory user comprised in the first smart contract, wherein the association relationship is stored in the blockchain; and
determining a respective second smart contract corresponding to the associated target contract address information as the respective second smart contract corresponding to each signatory user.

7. The computer-implemented method of claim 3, wherein the obtaining a contract template corresponding to the target electronic contract based on the creation information comprises:
obtaining a contract template from the creation information, and determining the obtained contract template as the contract template corresponding to the target electronic contract; or
obtaining an associated target contract template from an association relationship between predetermined template identification information and the contract template based on template identification information in the creation information, and determining the associated target contract template as the contract template corresponding to the target electronic contract.

8. The computer-implemented method of claim 1, wherein the deploying, by a blockchain node of a blockchain network, a second smart contract corresponding to a signatory user of a target electronic contract for managing information associated with the signatory user comprises:
receiving a registration request sent by the signatory user, wherein the registration request comprises information about the signatory user;
deploying the second smart contract in the blockchain based on the information about the signatory user;
associatively storing user identification information of the signatory user and contract address information of the second smart contract in the blockchain; and
sending registration success information to the signatory user.

9. The computer-implemented method of claim 1, wherein after the creating the target electronic contract based on the first smart contract, the computer-implemented method further comprises:
determining contract identification information of the target electronic contract, and associatively storing the target electronic contract, the contract identification information of the target electronic contract, and contract identification information of the first smart contract in the blockchain; and wherein
the signing the target electronic contract based on the first smart contract and the second smart contract corresponding to the signatory user comprises:
obtaining user identification information of the signatory user, the contract identification information of the target electronic contract and first signature data from the contract signing request, wherein the first signature data is signature data obtained by signing specified data based on a private key of the signatory user; and
in response to determining that associated contract identification information of the first smart contract is identified from the blockchain based on the contract identification information of the target electronic contract, associated first smart contract corresponding to the associated contract identification information of the first smart contract comprises the user identification information of the signatory user, and the first signature data is verified based on an obtained public key of the signatory user:
signing the target electronic contract based on the associated first smart contract and the second smart contract corresponding to the signatory user.

10. The computer-implemented method of claim 9, wherein after the creating the target electronic contract according to the creation information based on the first smart contract, the computer-implemented method further comprises:
sending contract-creation success information to the requesting user, wherein the contract-creation success information comprises the contract identification information of the target electronic contract;
receiving a contract identification request sent by the requesting user, wherein the contract identification request comprises contract identification information of the target electronic contract to be identified;
obtaining associatively stored target electronic contract from the blockchain based on the contract identification information of the target electronic contract; and
sending the associatively stored target electronic contract to the requesting user.

11. The computer-implemented method of claim 1, wherein after the signing the target electronic contract based on the first smart contract and the second smart contract corresponding to the signatory user, the computer-implemented method further comprises:
generating contract signing recording information based on the contract signing request; and
storing the contract signing recording information in the blockchain.

12. A non-transitory, computer-readable medium storing one or more instructions executable by a computer system to perform operations comprising:
deploying, by a blockchain node of a blockchain network, a second smart contract corresponding to a signatory user of a target electronic contract for managing information associated with the signatory user;
receiving, by the blockchain node of the blockchain network, a contract creating request from a requesting user, wherein the contract creating request comprises creation information of the target electronic contract to be created;
deploying, by the blockchain node, a first smart contract for managing the target electronic contract in a blockchain based on the creation information;
creating, by the blockchain node, the target electronic contract according to the creation information and based on the first smart contract; and
in response to receiving a contract signing request from the signatory user of the target electronic contract, wherein the contract signing request comprises user identification information of the signatory user:
invoking, by the blockchain node, the first smart contract;
determining, by the blockchain node and based on the first smart contract, the second smart contract corresponding to the signatory user according to the user identification information of the signatory user;
obtaining, by the blockchain node, signature information of the signatory user based on the second smart contract; and
signing, by the blockchain node, the target electronic contract based on the signature information.

13. The non-transitory, computer-readable medium of claim 12, wherein the signing the target electronic contract based on the signature information comprises:
identifying the target electronic contract based on a predetermined signature position identification algorithm to obtain signature position information; and
signing the target electronic contract based on the signature information and the signature position information.

14. The non-transitory, computer-readable medium of claim 12, wherein the creating the target electronic contract according to the creation information and based on the first smart contract comprises:
obtaining a contract template corresponding to the target electronic contract according to the creation information based on the first smart contract;
determining a respective second smart contract corresponding to each signatory user of the target electronic contract;
obtaining respective identity information of each signatory user based on the respective second smart contract; and
creating the target electronic contract based on the contract template and the respective identity information.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
deploying, by a blockchain node of a blockchain network, a second smart contract corresponding to a signatory user of a target electronic contract for managing information associated with the signatory user;
receiving, by the blockchain node of the blockchain network, a contract creating request from a requesting user, wherein the contract creating request comprises creation information of the target electronic contract to be created;
deploying, by the blockchain node, a first smart contract for managing the target electronic contract in a blockchain based on the creation information;
creating, by the blockchain node, the target electronic contract according to the creation information and based on the first smart contract; and
in response to receiving a contract signing request from the signatory user of the target electronic contract, wherein the contract signing request comprises user identification information of the signatory user:
invoking, by the blockchain node, the first smart contract;
determining, by the blockchain node and based on the first smart contract, the second smart contract corresponding to the signatory user according to the user identification information of the signatory user;
obtaining, by the blockchain node, signature information of the signatory user based on the second smart contract; and
signing, by the blockchain node, the target electronic contract based on the signature information.

16. The computer-implemented system of claim 15, wherein the signing the target electronic contract based on the signature information comprises:
identifying the target electronic contract based on a predetermined signature position identification algorithm to obtain signature position information; and
signing the target electronic contract based on the signature information and the signature position information.

17. The computer-implemented system of claim 15, wherein the creating the target electronic contract according to the creation information and based on the first smart contract comprises:

obtaining a contract template corresponding to the target electronic contract according to the creation information based on the first smart contract;
determining a respective second smart contract corresponding to each signatory user of the target electronic contract;
obtaining respective identity information of each signatory user based on the respective second smart contract; and
creating the target electronic contract based on the contract template and the respective identity information.

* * * * *